United States Patent
Vajravel et al.

(10) Patent No.: US 11,113,393 B2
(45) Date of Patent: Sep. 7, 2021

(54) PROVIDING SECURITY FEATURES IN WRITE FILTER ENVIRONMENTS

(71) Applicant: Dell Products L.P., Round Rock, TX (US)

(72) Inventors: Gokul Thiruchengode Vajravel, Bangalore (IN); Ankit Kumar, Bengaluru (IN); Abhishek Mathur, Allahabad (IN)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 16/673,714

(22) Filed: Nov. 4, 2019

(65) Prior Publication Data

US 2021/0133316 A1    May 6, 2021

(51) Int. Cl.
*G06F 21/00* (2013.01)
*G06F 21/54* (2013.01)

(52) U.S. Cl.
CPC ........ *G06F 21/54* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,536,084 B1 * | 1/2017 | Lukacs | G06F 21/53 |
| 10,606,766 B1 * | 3/2020 | Rellinger | G06F 21/60 |
| 2018/0351969 A1 * | 12/2018 | MacLeod | H04L 63/1416 |
| 2020/0110892 A1 * | 4/2020 | Ramakrishnappa | G06F 9/545 |
| 2021/0117332 A1 * | 4/2021 | Vajravel | G06F 16/11 |

OTHER PUBLICATIONS

Shang, Gao et al. Remote forensics system based on Minifilter. Proceedings of 2012 2nd International Conference on Computer Science and Network Technology. https://ieeexplore.IEEE.org/stamp/stamp.jsp?tp=&arnumber=6526178 (Year: 2012).*
Buda, Adrian; Colesa, Adrian. File System Minifilter Based Data Leakage Prevention System. 2018 17th RoEduNet Conference: Networking in Education and Research (RoEduNet). https://ieeexplore.IEEE.org/stamp/stamp.jsp?tp=&arnumber=8514147 (Year: 2018).*

* cited by examiner

*Primary Examiner* — Jeremiah L Avery
(74) *Attorney, Agent, or Firm* — Kirton Mcconkie; Brian Tucker

(57) ABSTRACT

A security client can provide security features in write filter environments. To prevent improper modifications to a protected volume, the security client can be employed to differentiate between direct I/O requests and reparsed I/O requests that are directed to a shadow volume and to block any direct I/O requests. Alternatively or additionally, the security client can be configured to determine whether an I/O request that is directed to the shadow volume targets an artifact in the write filter's exclusion list, and if not, block the I/O request. Alternatively or additionally, the security client can be configured to monitor registry operations to determine whether a modifying registry operation targets the write filter's persistent shadow registry hive, and if so, allow the modifying registry operation only if it targets a registry key in the write filter's exclusion list.

20 Claims, 25 Drawing Sheets

PROVIDING SECURITY FEATURES IN WRITE FILTER ENVIRONMENTS

CROSS-REFERENCE TO RELATED APPLICATIONS

N/A

BACKGROUND

Operating systems, such as Windows, provide functionality for preventing the content of a storage medium from being changed. In a typical example, it may be desirable to prevent the operating system image, which may be stored on a particular disk partition or on flash media, from being changed at runtime. As one example only, Windows 10 provides the Unified Write Filter (UWF) which can be used to redirect all writes that target the operating system image to a RAM or disk cache called an overlay. This overlay stores changes made to the operating system at runtime but is removed when the device is restarted thereby restoring the device to its original state.

In this specification, a volume should be construed in its ordinary way as a logical unit that represents an area of persistent storage to the file system. A volume can correspond to a single physical storage device, such as a hard disk, but can also correspond to a single partition on a physical storage device with multiple partitions. A volume can also span across multiple physical storage devices. A "protected volume" is a volume that a write filter protects. In other words, when a write filter is employed, the write filter will protect the content (e.g., files, directories, registry entries, etc.) of the volume from being changed.

FIG. 1A illustrates a simplified Windows-based I/O system architecture 100 when a write filter 140 is employed. Write filter 140 may typically be the Windows UWF but may equally be the Windows File Based Write Filter (FBWF) or a third-party write filter (e.g. the Dell Write Filter). Architecture 100 includes a disk 105 which may oftentimes be a solid-state drive (SSD) but may represent a physical hard disk, an internal USB device, an external SATA device or any other physical storage medium (or media) that may be compatible with a write filter. In accordance with the definition of a volume, disk 105 includes an area of persistent storage that is represented by a volume. Disk stack 110 represents the various drivers that enable disk 105 to be accessed and are not critical to an understanding of the present invention.

In the Windows operating system, when write filter 140 is employed to protect the content of a volume from modification, two different I/O stacks that represent the protected volume are loaded above disk stack 110: a "protected I/O stack" that includes volume stack 120a and file system stack 130a; and an "unprotected I/O stack" that includes volume stack 120b and file system stack 130b. The protected I/O stack can be viewed as the primary I/O stack and handles I/O requests that do not modify content on the protected volume (e.g., read requests). The unprotected I/O stack can be viewed as a pseudo I/O stack and handles I/O requests that modify content on the protected volume (e.g., write requests). For purposes of this description and the claims, a write request should be construed as encompassing I/O requests that modify existing content and I/O requests that create new content. The limited scenarios where such write requests would occur to the protected volume are described below.

Write filter 140 (which in FIG. 1A may be in the form of a file system filter driver) is loaded above file system stack 130a on the protected I/O stack so that it can intercept all requests to access the content of the protected volume. When write filter 140 receives a request to read content from the protected volume, and assuming the content was not previously modified and stored in overlay 150, it can send the request down the protected I/O stack so that the content will be read from disk 105 in a typical manner. In contrast, when write filter 140 receives a request to write content on the protected volume, it redirects the request so that the write is made in overlay 150 (i.e., the new/modified content is stored in overlay 150 while the content stored on disk 105 remains unchanged). Once modified content is stored in overlay 150, write filter 140 will ensure that any subsequent request to access the modified content will be completed using the modified content stored in overlay 150.

There are some scenarios where write filter 140 will allow content on the protected volume to be modified. For example, an administrator can register an exclusion with write filter 140 for particular content on the protected volume (e.g., particular files or folders). In such cases, write filter 140 will not redirect any request that would modify the excluded content to overlay 150, but instead will cause the request to be passed down the unprotected I/O stack thereby causing the excluded content to be modified on the protected volume. As another example, write filter 140 enables an administrator to cause modified content stored in overlay 150 to be committed to disk 105. In such cases, when write filter 140 detects the write request pertaining to the commit, it will cause it to be passed down the unprotected I/O stack. Accordingly, even when write filter 140 is employed, it is still possible to modify some content on the protected volume.

When write filter 140 is implemented in Windows environments, it may also typically include a registry filter so that the content of the Windows registry remains unchanged. FIG. 1B depicts architecture 100 in this registry context. In FIG. 1B, write filter 140 is shown as being loaded above the configuration manager 160 of the Windows operating system (e.g., in the form of a registry filter driver that registers for registry operation callbacks). The configuration manager is the component that handles all registry operations in the Windows operating system. Write filter 140 will therefore be able to evaluate registry operations before they are passed to configuration manager 160. FIG. 1B also depicts the registry hives that are permanently stored on the protected volume on disk 105 as well as the in memory registry that includes "original" registry hives built from the registry hives on the protected volume. For simplicity, configuration manager 160 is shown as accessing the registry hives via a hardware abstraction layer.

Absent write filter 140, a registry write operation would cause configuration manager 160 to update the original registry hives that are part of the in memory registry and ultimately persist these updates to the registry hives on the protected volume. However, to prevent changes to the registry from being persisted, write filter 140 can create temporary shadow registry hives in the in memory registry. In a similar manner as described above, write filter 140 can allow any registry read operation to be handled in a typical manner by allowing configuration manager 160 to perform the read against the original registry hives (assuming the targeted registry key has not previously been update), but can redirect any registry write operation so that configuration manager 160 will perform the write against the temporary shadow registry hives (e.g., to create the updated key/value in the temporary shadow registry hives rather than in the original registry hives). The temporary shadow registry hives are discarded at reboot thereby preventing the registry hives on the protected volume from being changed.

Write filter 140 also allows registry keys to be excluded from this filtering so that updates to the excluded registry keys will be persisted across reboots. To enable this, write filter 140 creates persistent shadow registry hives in the in memory registry for any excluded registry keys and redirects registry write operations that target the excluded registry keys to the persistent shadow registry hives. Any changes reflected in these persistent shadow registry hives are persisted to the registry hives on the protected volume at reboot.

This architecture of write filter 140 creates various vulnerabilities. For example, as represented in FIG. 1A, to allow writes to excluded files/folders to be persisted, there will be an unprotected I/O stack to which write filter 140 can reparse write requests. This unprotected I/O stack can be viewed as a "shadow volume." For clarity, it is noted that both the protected volume and the shadow volume represent the same content on disk (e.g., they both can represent the same partition where the operating system is installed).

Since write filter 140 is not present on the unprotected I/O stack (or in other words, since write filter 140 does not protect the shadow volume), a malicious program could generate write requests that directly target the shadow volume so that the write requests will not be provided to write filter 140. To address this vulnerability, current techniques simply hide the shadow volume from Windows Explorer (e.g., by assigning a GUID such as \Global??\ShadowVolume-1 rather than assigning a drive letter). Yet, a malicious user or program can easily find the shadow volume (e.g., by using the mountvol command or the IOCTL_MOUNTMGR_QUERY_POINTS command) and then generate I/O commands to directly write/update content on the shadow volume. Because such I/O commands directly target the shadow volume, they will not pass through write filter 140 but will cause content on the protected volume to be changed. Similarly, a malicious user or program can generate registry write operations that directly target the persistent shadow registry hives. Although such registry write operations would be passed to it, write filter 140 will be not block them since they target the persistent shadow registry hives. These changes would ultimately be persisted to the registry hives on the protected volume. In short, it is relatively easy to leverage write filter 140's exclusion functionality to bypass the protections that write filter 140 is intended to provide.

BRIEF SUMMARY

The present invention extends to methods, systems and computer program products for providing security features in write filter environments. To prevent improper modifications to a protected volume, a security client can be employed to differentiate between direct I/O requests and reparsed I/O requests that are directed to a shadow volume and to block any direct I/O requests. Alternatively or additionally, the security client can be configured to determine whether an I/O request that is directed to the shadow volume targets an artifact in the write filter's exclusion list, and if not, block the I/O request. Alternatively or additionally, the security client can be configured to monitor registry operations to determine whether a modifying registry operation targets the write filter's persistent shadow registry hive, and if so, allow the modifying registry operation only if it targets a registry key in the write filter's exclusion list.

In some embodiments, the present invention is implemented, by a security client on a computing device, as a method for providing security features in a write filter environment that includes a protected I/O stack on which a write filter is loaded to prevent modification to artifacts on a protected volume and an unprotected I/O stack by which the write filter enables excluded artifacts to be modified. A minifilter of the security client that is loaded on the unprotected I/O stack can receive an I/O request. The minifilter can then determine whether the I/O request is a reparsed I/O request or a direct I/O request. When the minifilter determines that the I/O request is a reparsed I/O request, it can allow the I/O request to be passed down the unprotected I/O stack. In contrast, when the minifilter determines that the I/O request is a direct I/O request, it can block the I/O request.

In some embodiments, the present invention is implemented as computer storage media that stores computer executable instructions which when executed on a computing device implement a security client that is configured to provide security features in a write filter environment. A minifilter of the security client that is loaded on the unprotected I/O stack can receive a first I/O request and determine that the first I/O request is a direct I/O request. In response to determining that the first I/O request is a direct I/O request, the minifilter can block the first I/O request. The minifilter can also receive a second I/O request and determine that the second I/O request is a reparsed I/O request. In response to determining that the second I/O request is a reparsed I/O request, the minifilter can allow the second I/O request.

In some embodiments, the present invention is implemented by a security client as a method for providing security features in a write filter environment. A first minifilter of the security client that is loaded on the protected I/O stack can receive a first I/O request and detect that the first I/O request is reparsed. In response to detecting that the first I/O request is reparsed, the first minifilter can add a tag to the first I/O request. A second minifilter of the security client that is loaded on the unprotected I/O stack can receive the first I/O request and determine that the first I/O request includes the tag. In response to determining that the first I/O request includes the tag, the second minifilter can allow the first I/O request.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client device" should be construed as any user computing device that is capable of executing a write filter. A client device would therefore include desktops, laptops, tablets, thin clients, smart phones, etc. The term "write filter" should be construed as a software component that is employed to protect the content of a storage device from being modified by redirecting I/O requests that target the content so that the modifications are stored elsewhere. Embodiments of the present invention will be described in the context of a write filter provided with the Windows operating system (e.g., the UWF). However, embodiments of the present invention can equally be implemented on a client device that runs a non-Windows operating system as well as on a client device that runs Windows but employs another write filter including third party (i.e., non-Windows) write filters.

The term "reparse" is a term of art understood by those of ordinary skill. When a filter driver receives an I/O request, it can reparse the I/O request to cause it to be passed to a different I/O stack. For example, in the context of the present invention, write filter 140, which is loaded on the protected I/O stack, can reparse a write request that targets an excluded file so that the write request is passed down the unprotected I/O stack.

Figure 1A:
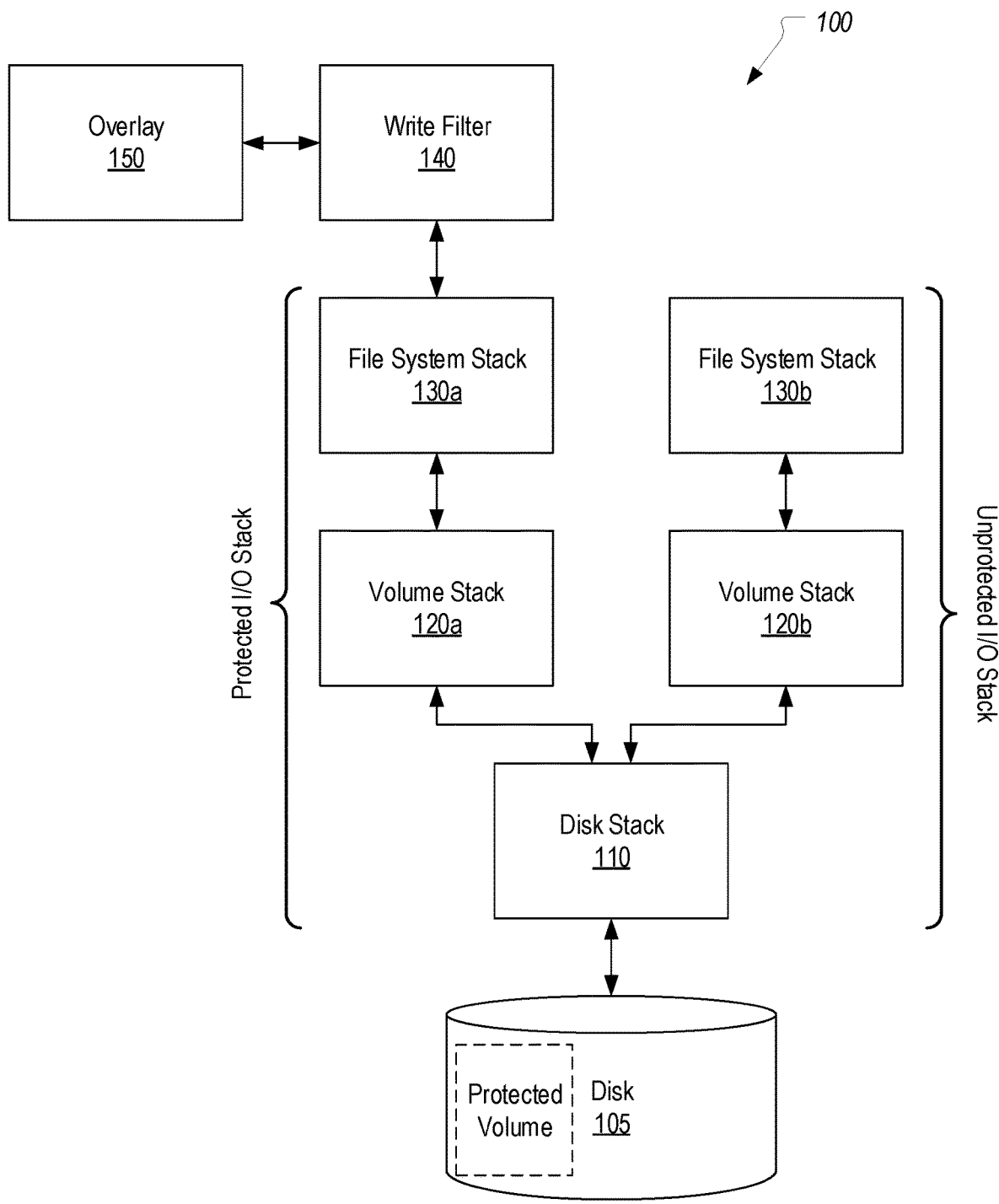
FIG. 1A illustrates a Windows-based I/O system architecture in which a write filter is employed to redirect writes targeting a protected volume to an overlay.
Figure 1B:
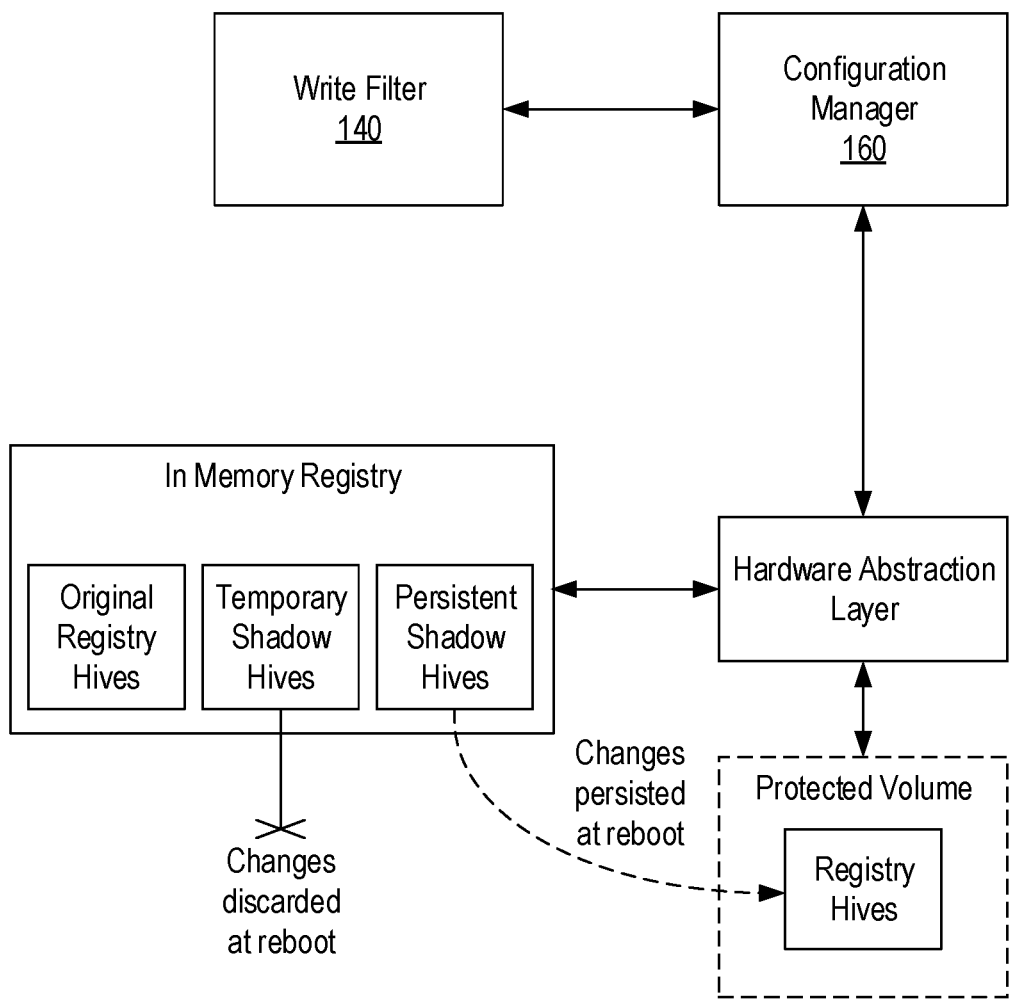
FIG. 1B illustrates how the write filter can also be employed to prevent changes to the registry from being persisted to the protected volume.
Figure 2:
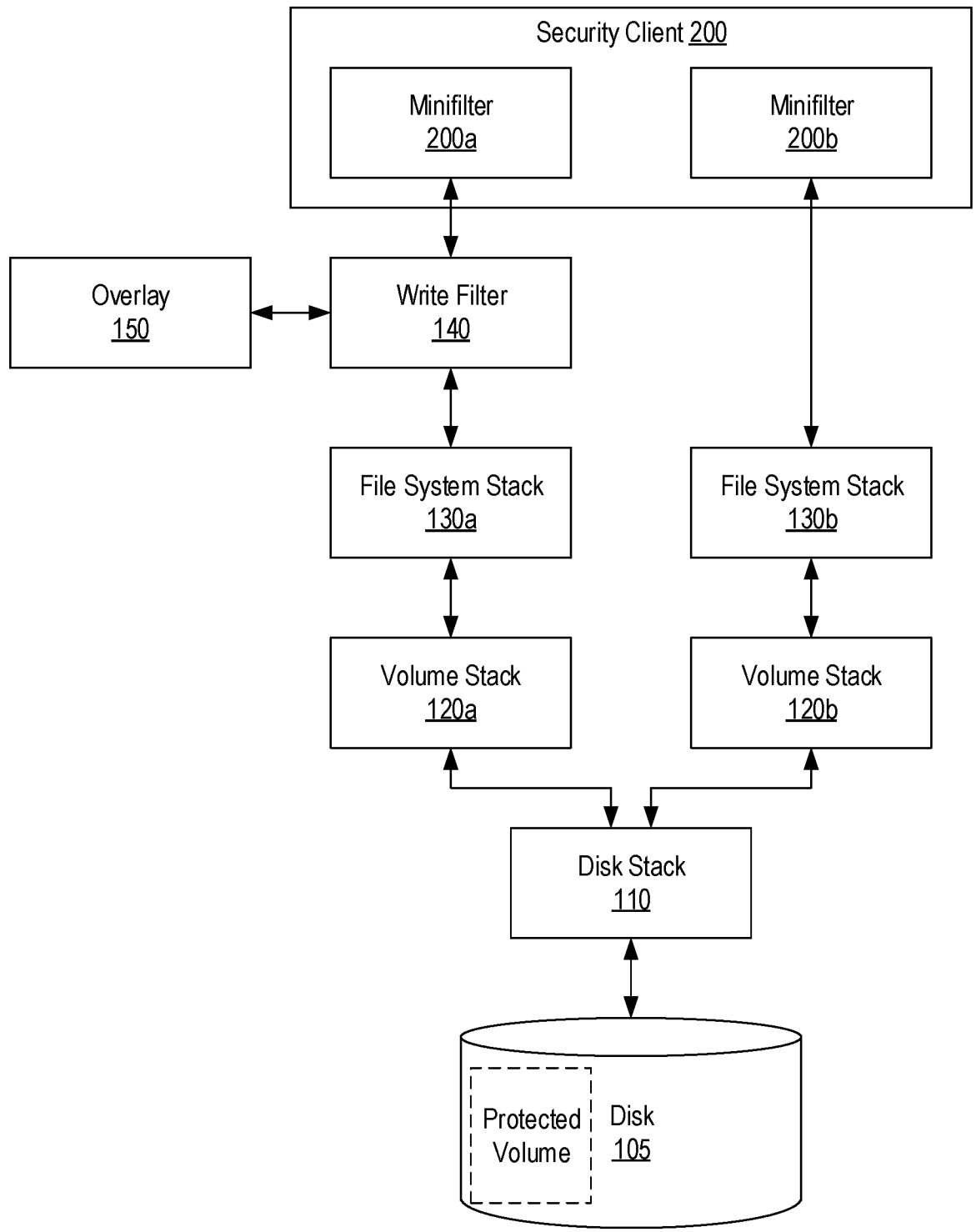
FIGS. 2, 2A and 2B each illustrate examples of how a security client can be included in an I/O system architecture to prevent improper modification to the content of the protected volume.
Figure 2A:
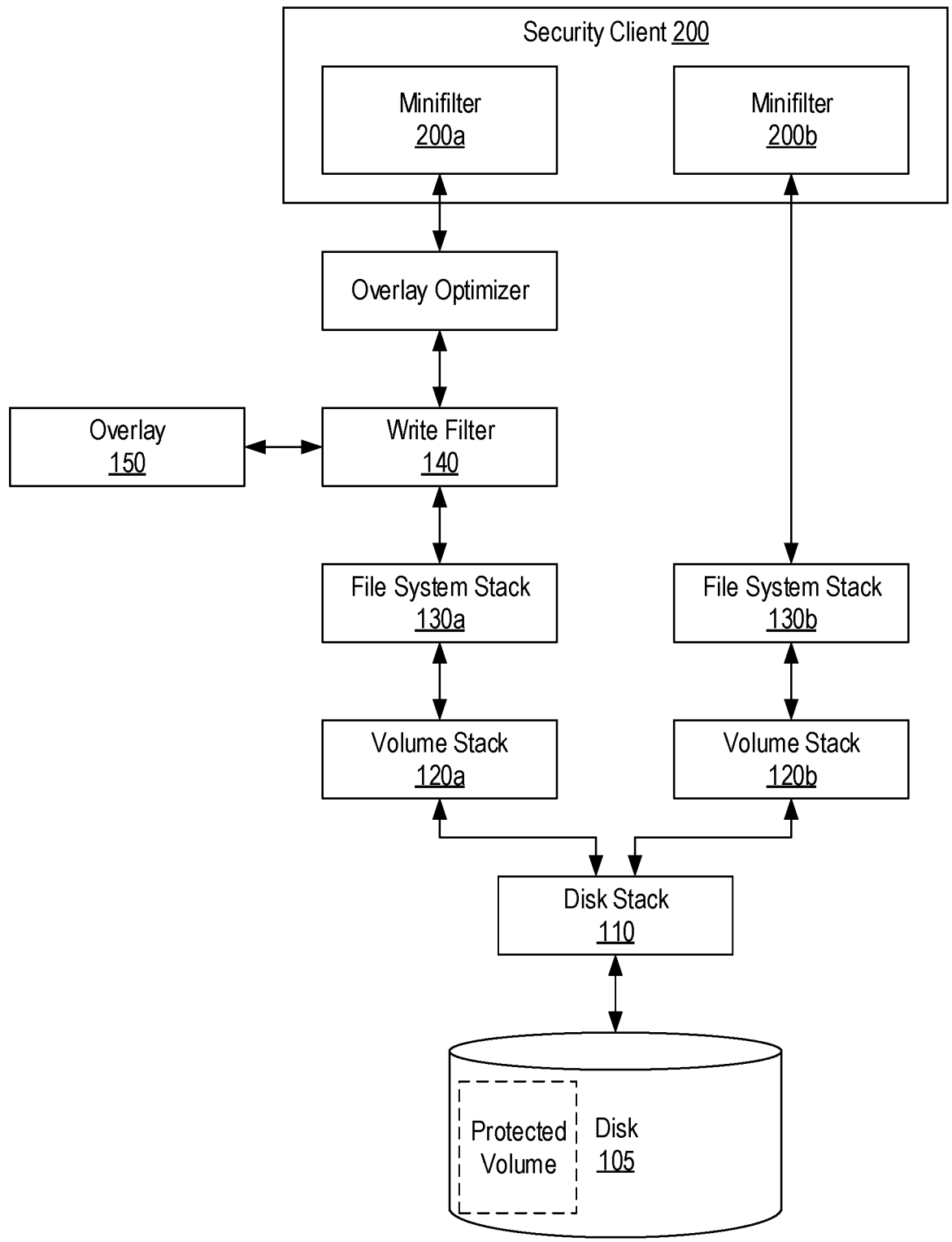
Figure 2B:
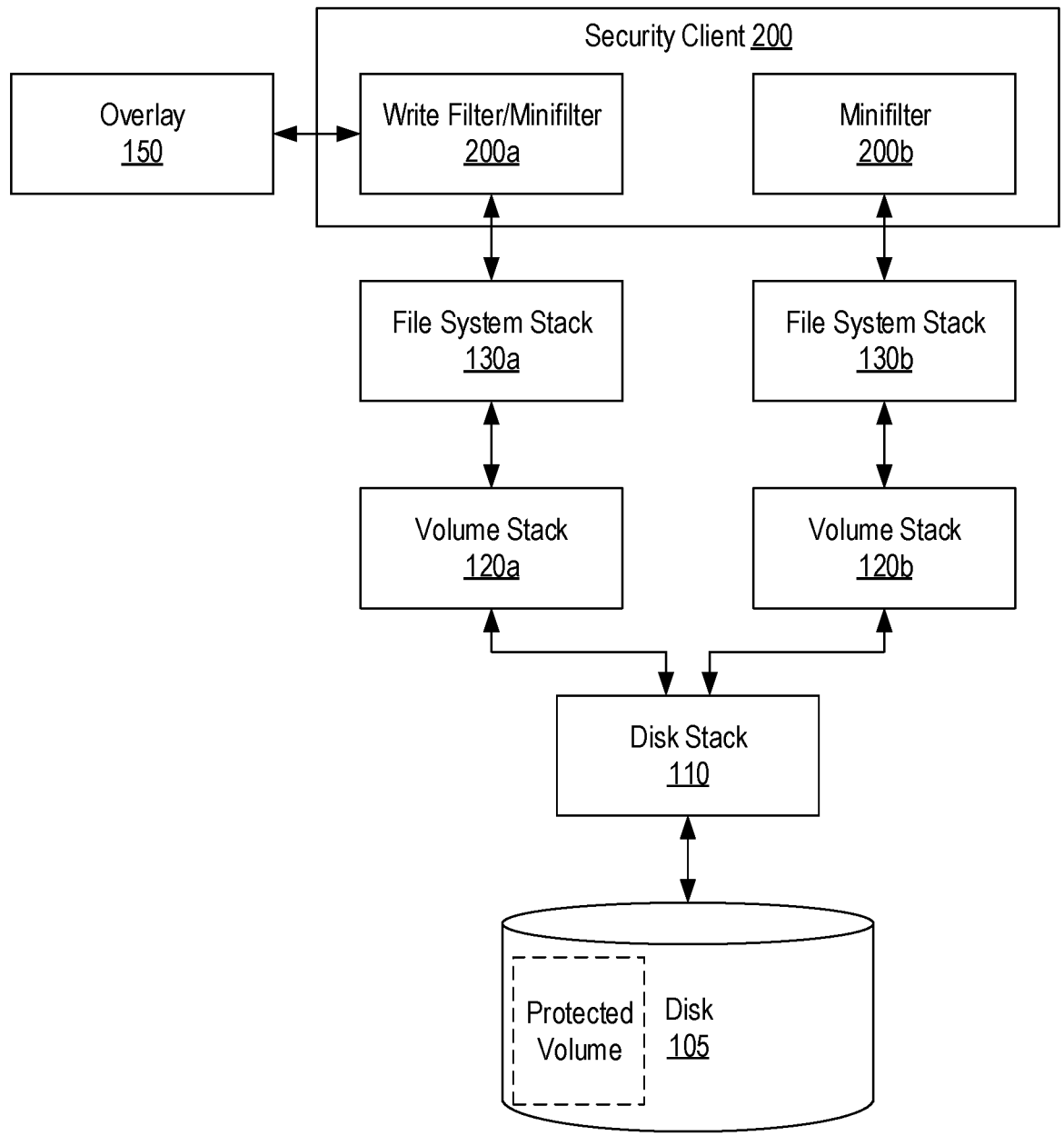

FIG. 2 illustrates how a security client 200 can be employed in architecture 100 to prevent improper modification to the content of the protected volume. As shown, security client 200 can include two filter drivers: minifilter 200a which is loaded on the protected I/O stack above write filter 140; and minifilter 200b which is loaded on the unprotected I/O stack. FIG. 2A represents that security client 200 may also be employed in architecture 100 in conjunction with an overlay optimizer, an example of which is described in U.S. Pat. Publ. No. 2018/0217940. FIG. 2B represents that security client 200 may also replace write filter 140 by integrating the write filter functionality into minifilter 200a. Accordingly, security client 200 could be used in many different write filter environments.

As an overview, security client 200 can be configured to detect I/O requests that directly target the shadow volume as opposed to I/O requests that were reparsed to target the shadow volume. When security client 200 detects an I/O request that directly targets the shadow volume, it can block the request. In this way, security client 200 ensures that the content of the protected volume will only be modified by I/O requests that write filter 140 (or write filter/minifilter 200a) reparsed.

FIGS. 3A-3D provide an example of how security client 200 can block I/O requests that directly target the shadow volume while allowing reparsed I/O requests to be passed down the unprotected I/O stack. This example will be based on the environment shown in FIG. 2, but is equally applicable to the environments shown in FIGS. 2A and 2B and any other suitable write filter environment.

Prior to describing FIGS. 3A-3D, it is noted that minifilter 200a will receive any I/O request that targets the protected volume (i.e., any I/O request that is being passed down the protected I/O stack). On the other hand, minifilter 200b will receive any I/O request that targets the shadow volume (i.e., any I/O request that is being passed down the unprotected I/O stack). As an example, FIGS. 3A-3D include an I/O manager/filter manager that implements this process of passing I/O requests within the I/O stacks.

Figure 3A:
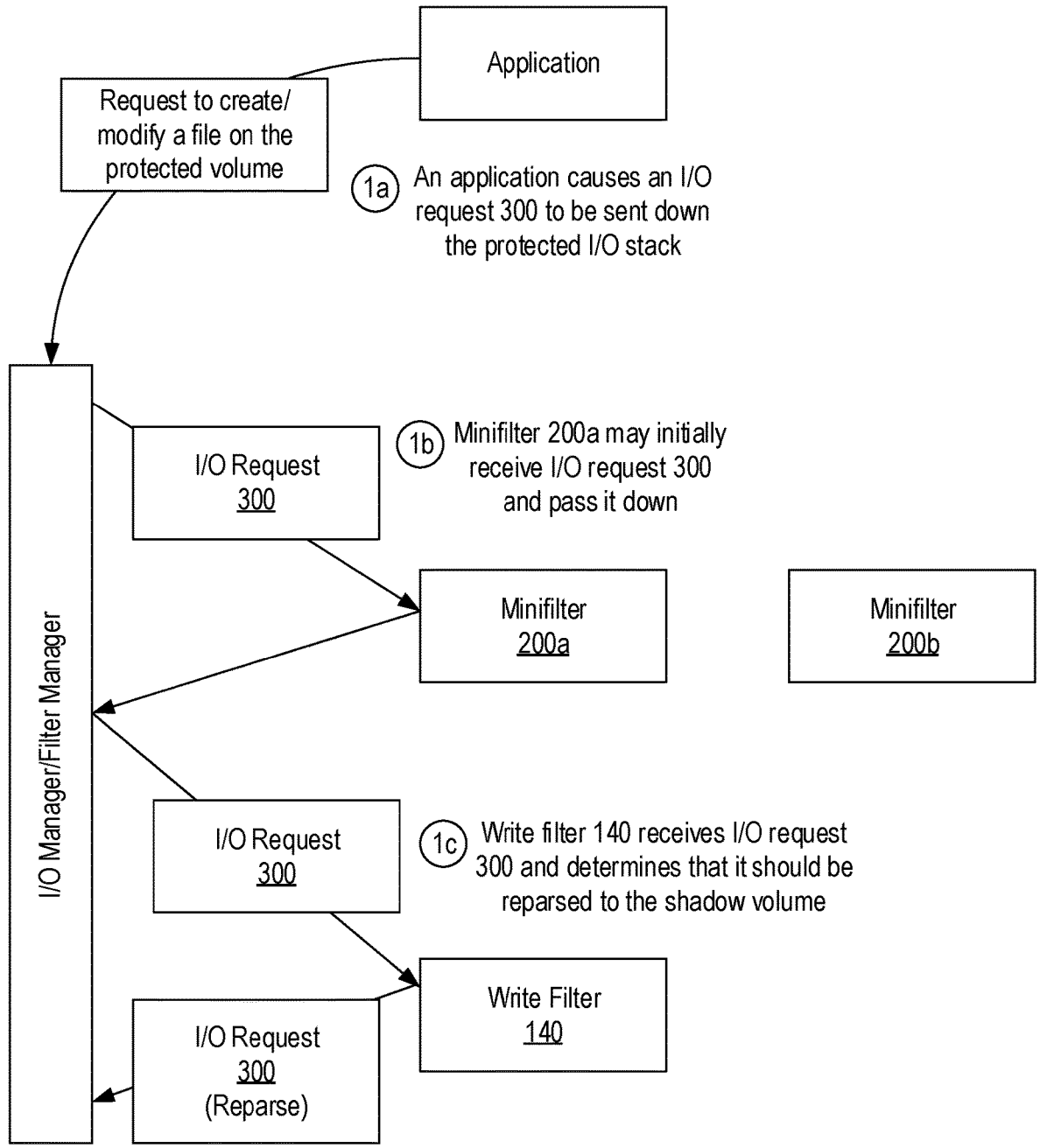
FIGS. 3A-3D illustrate how a security client can block I/O requests that directly target a shadow volume while allowing reparsed I/O requests.

In FIG. 3A, it is assumed that, in step 1a, an application has requested that an artifact (e.g., a file or folder) be modified or created on the protected volume. As one example only, an administrator could have employed the application to modify a file that is included in write filter 140's exclusion list. As a result, an I/O request 300 will be created and passed down the protected I/O stack. In a Windows environment, I/O request 300 may be an IRP_MJ_CREATE request. Because minifilter 200a is loaded on the protected I/O stack, in step 1b, minifilter 200a receives I/O request 300. For example, the filter manager may pass an IRP_MJ_CREATE request to minifilter 200a by calling minifilter 200a's preoperation callback routine that it registered for such requests. At this point, minifilter 200a does not know whether write filter 140 will reparse I/O request 300 and may therefore simply pass I/O request 300 down the protected I/O stack.

In step 1c, write filter 140 receives I/O request 300 and determines that it should be reparsed to the shadow. For example, write filter 140 may determine that I/O request 140 pertains to a file in its exclusion list. In some embodiments, to reparse I/O request 300, write filter 300 may update a status of I/O request 300. For example, when write filter 140 is the UWF, as part of its preoperation callback routine for IRP_MJ_CREATE requests, it may set the Status member of the IO_STATUS_BLOCK structure to STATUS_REPARSE and may also set the Information member of the IO_STATUS_BLOCK structure to IO_REPARSE.

Figure 3B:
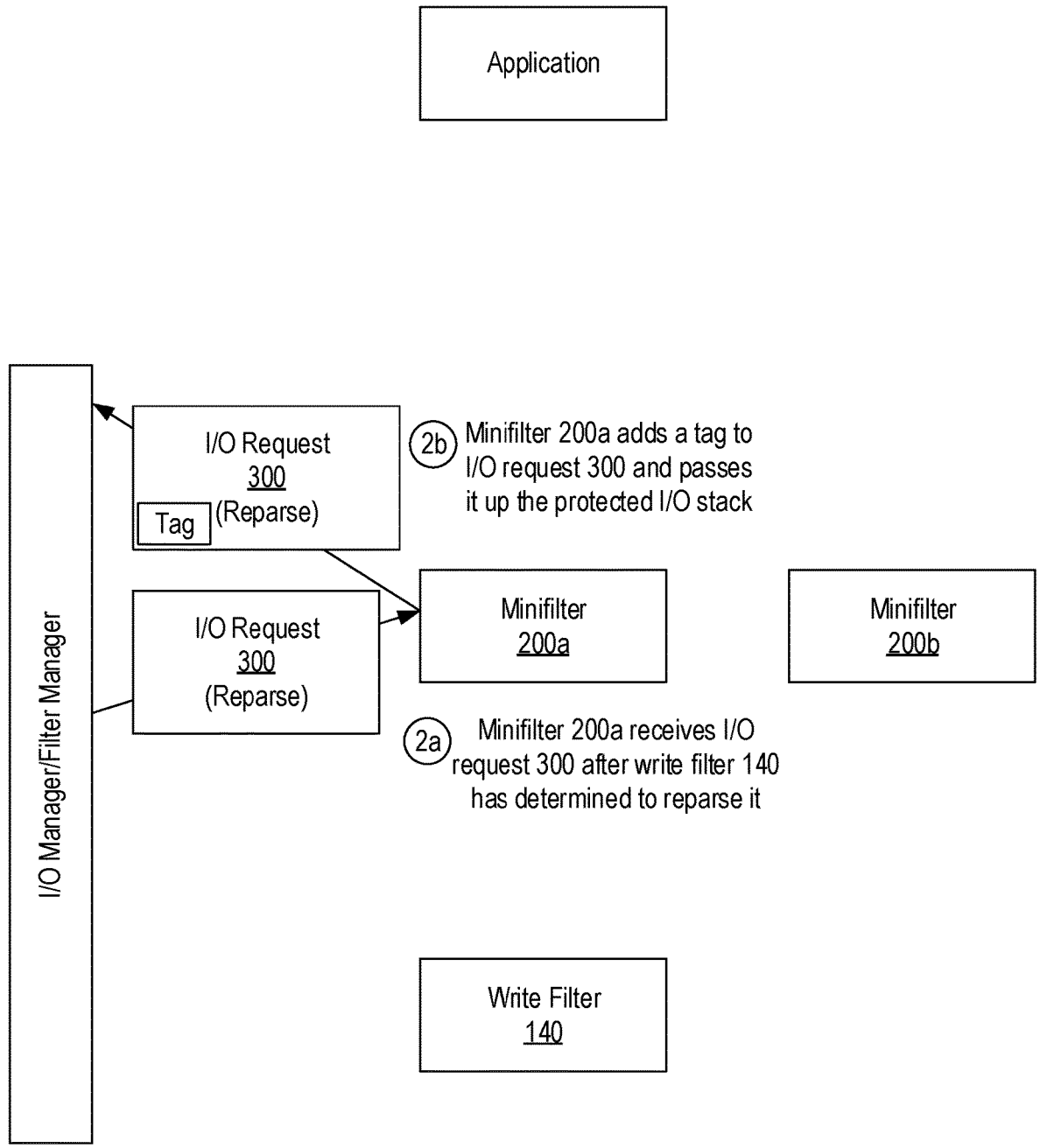

Turning to FIG. 3B, after write filter 140 has determined that I/O request 300 should be reparsed, in step 2a, I/O request 300 will be passed back to minifilter 200a. For example, the filter manager may call minifilter 200a's postoperation callback routine that it registered for IRP_MJ_CREATE requests. Minifilter 200a can then detect that I/O request 300 is being reparsed (e.g., by checking the values of the Status and/or Information members of the IO_STATUS_BLOCK). If minifilter 200a detects that I/O request 300 is being reparsed, in step 2b, minifilter 200a adds a tag to I/O request 300 and passes it up the protected I/O stack (e.g., by completing its postoperation callback routine).

The tag can represent any suitable information that minifilter 200a may be enabled to add to an I/O request. For example, in a Windows environment, the tag may be in the form of Extra Create Parameters (ECPs) that are attached to IRP_MJ_CREATE requests. To attach or set ECPs to an IRP_MJ_CREATE request, minifilter 200a may retrieve an existing ECP context structure list associated with the IRP_MJ_CREATE request (e.g., by calling FltGetEcpList-FromCallbackData) or create an ECP context structure list if one has not been associated with the request, create an ECP context structure (e.g., by calling FltAllocateExtraCreateParameter), populate/configure the ECP context structure to define the tag and insert the ECP context structure into the ECP context structure list (e.g., by calling FltInsertExtraCreateParameter).

An ECP context structure could define the tag in various ways including by employing a particular type of ECP context structure to define the tag and/or by including particular data within an ECP context structure. Therefore, the particular way in which minifilters 200a and 200b employ ECPs to define tags is not essential to the present invention.

Figure 3C:
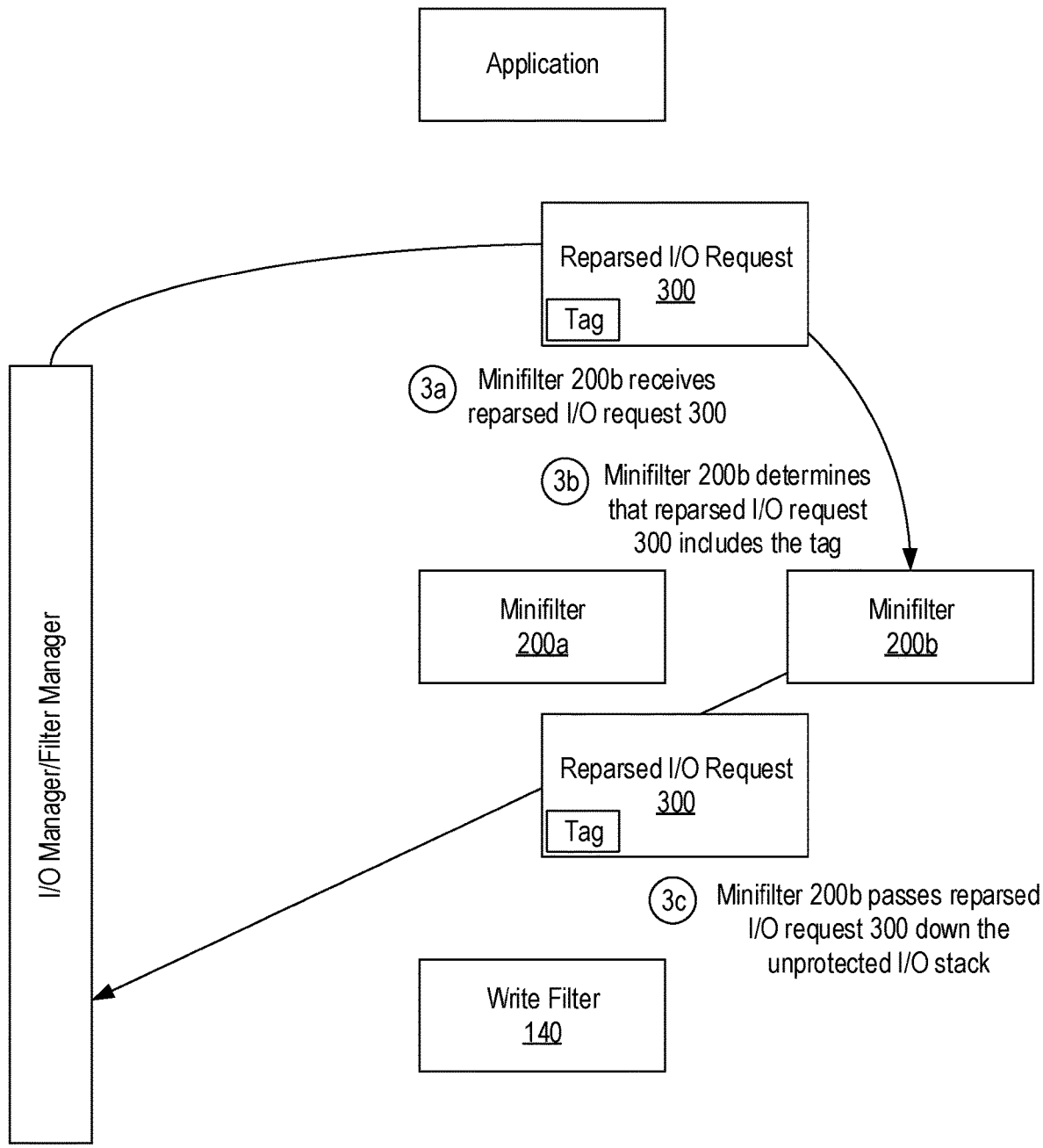

Turning to FIG. 3C, because write filter 140 has reparsed I/O request 300, the reparsed I/O request 300—which will now include the tag—is passed down the unprotected I/O stack and will therefore be received by minifilter 200b in step 3a. For example, the filter manager may pass reparsed I/O request 300 to minifilter 200b by calling minifilter 200b's preoperation callback routine that it registered for IPR_MJ_CREATE requests. Then, in step 3b, minifilter 200b examines reparsed I/O request 300 to determine that it includes the tag. For example, minifilter 200b could retrieve a pointer to the ECP context structure list associated with reparsed I/O request 300 (e.g., by calling FltGetEcpList-FromCallbackData) and then determine whether the ECP context structure list includes the tag (e.g., by calling FltFindExtraCreateParameter to search the ECP context structure list for a particular type of ECP context structure or by calling FltGetNextExtraCreateParamter to step through each ECP context structure in the ECP context structure list).

Because reparsed I/O request 300 includes the tag, minifilter 200b will allow reparsed I/O request 300 to be passed down the unprotected I/O stack. As a result, the artifact that reparsed I/O request 300 targets will be modified (or created) on the protected volume. Accordingly, when write filter 140 reparses an I/O request, the tag that minifilter 200a adds to the I/O request ensures that minifilter 200b will not block the I/O request.

Figure 3D:
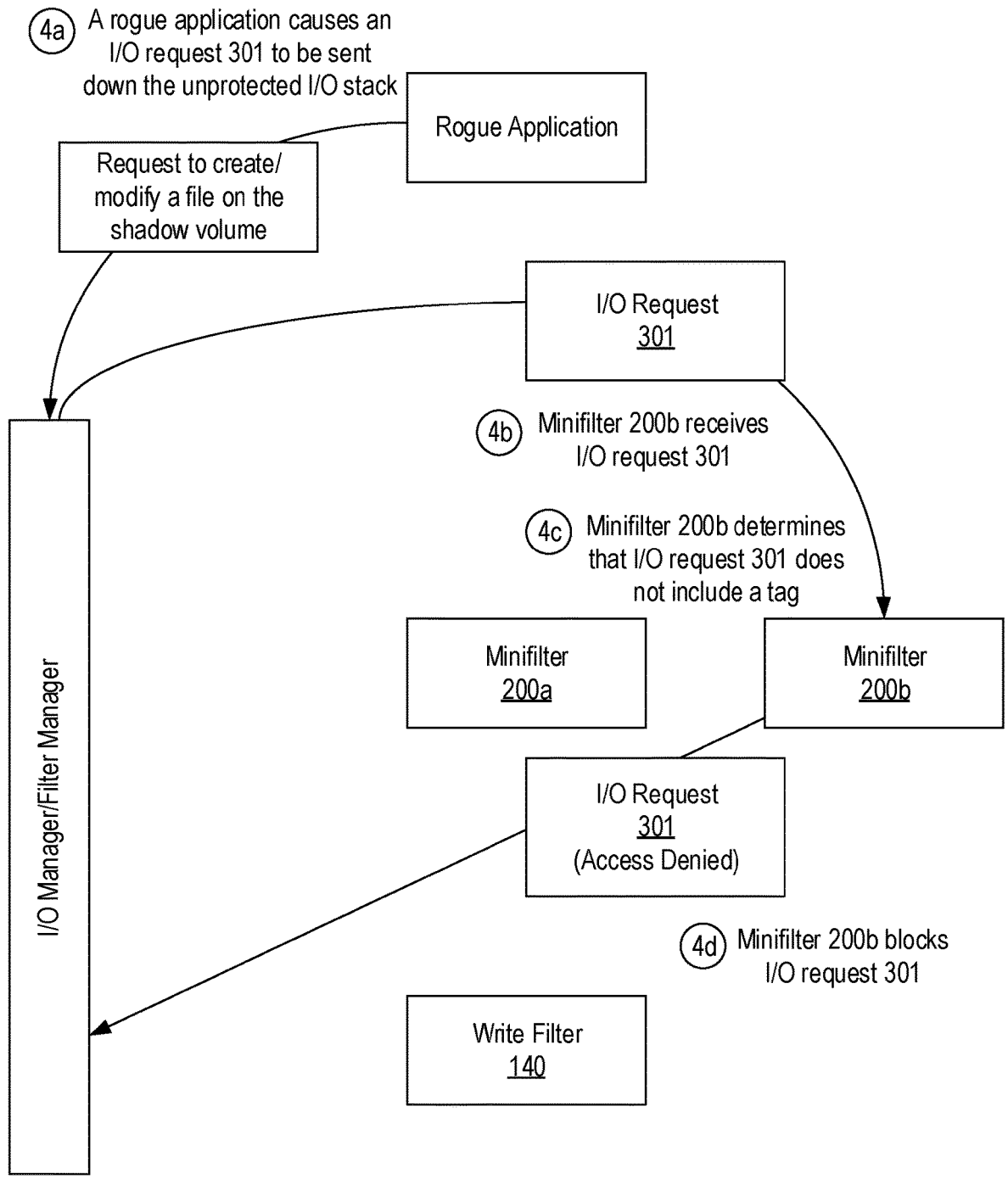

FIG. 3D provides a contrasting scenario in which a rogue application is assumed to have caused an I/O request 301 to be sent directly down the unprotected I/O stack. For example, the rogue application could have discovered the GUID assigned to the shadow volume and used the GUID to send a write request directly to the shadow volume (e.g., by writing to \Global??\ShadowVolume-1\file.txt as opposed to CAfile.txt). Because I/O request 301 targets the shadow volume, it will not be passed down the protected I/O stack and will therefore not be received by minifilter 200a or write filter 140. Instead, in step 4b, I/O request 301 is received by minifilter 200b. For example, the filter manager could pass I/O request 301 to minifilter 200b by calling minifilter 200b's preoperation callback routine that it registered for IRP_MJ_CREATE requests.

In step 4c, minifilter 200b will examine I/O request 301 in much the same manner as it examined I/O request 300. However, in this case, minifilter 200b will determine that I/O request 301 does not include the tag and can therefore conclude that I/O request 301 directly targets the shadow volume. Accordingly, in step 4d, minifilter 200b can block I/O request 301. For example, minifilter 200b can complete I/O request 301 with a status of ACCESS DENIED or another status that will prevent I/O request 301 from proceeding down the unprotected I/O stack.

Figure 4A:
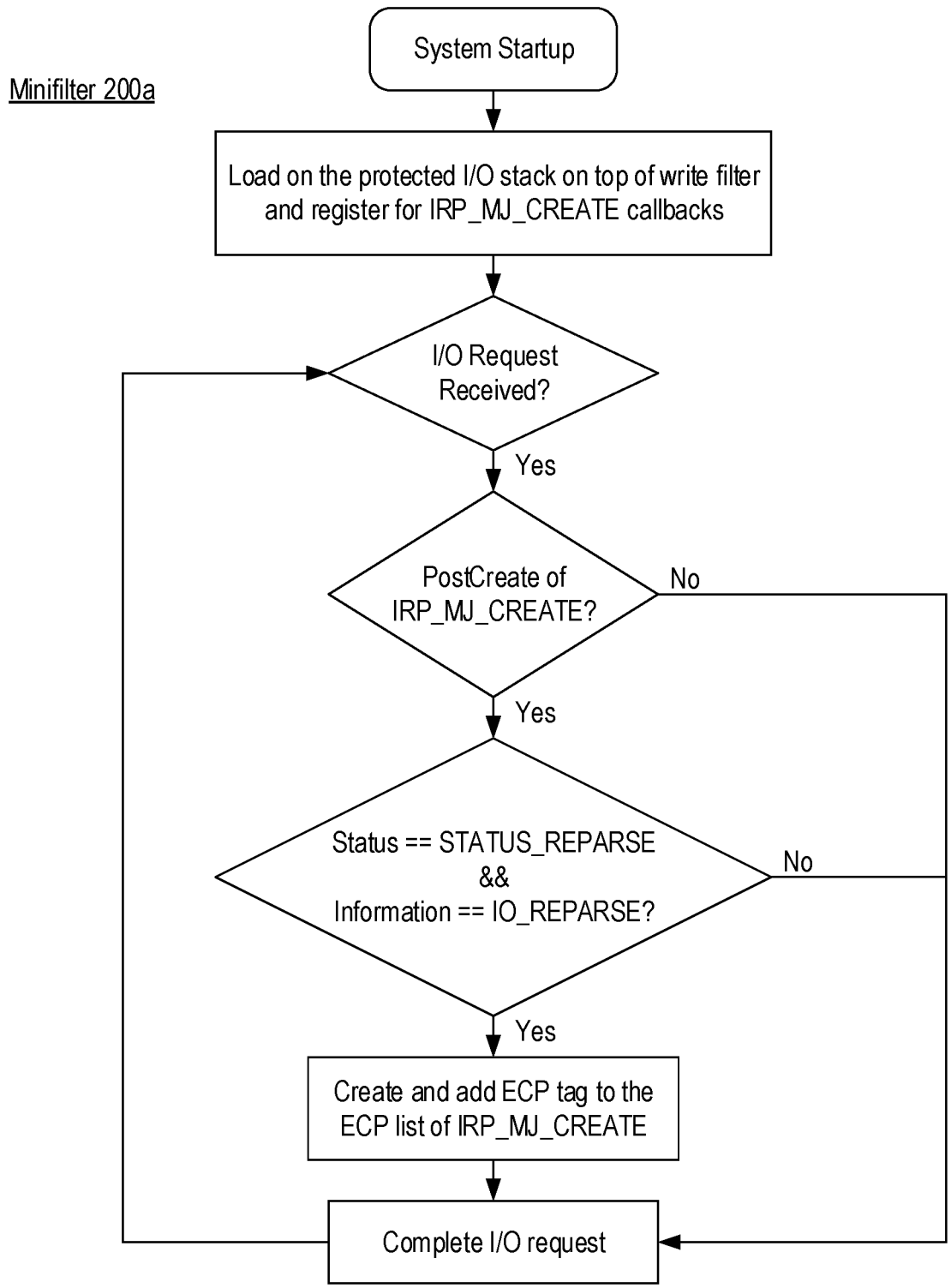
FIGS. 4A and 4B provide flow diagrams of example processes that minifilters of a security client can perform.
Figure 4B:
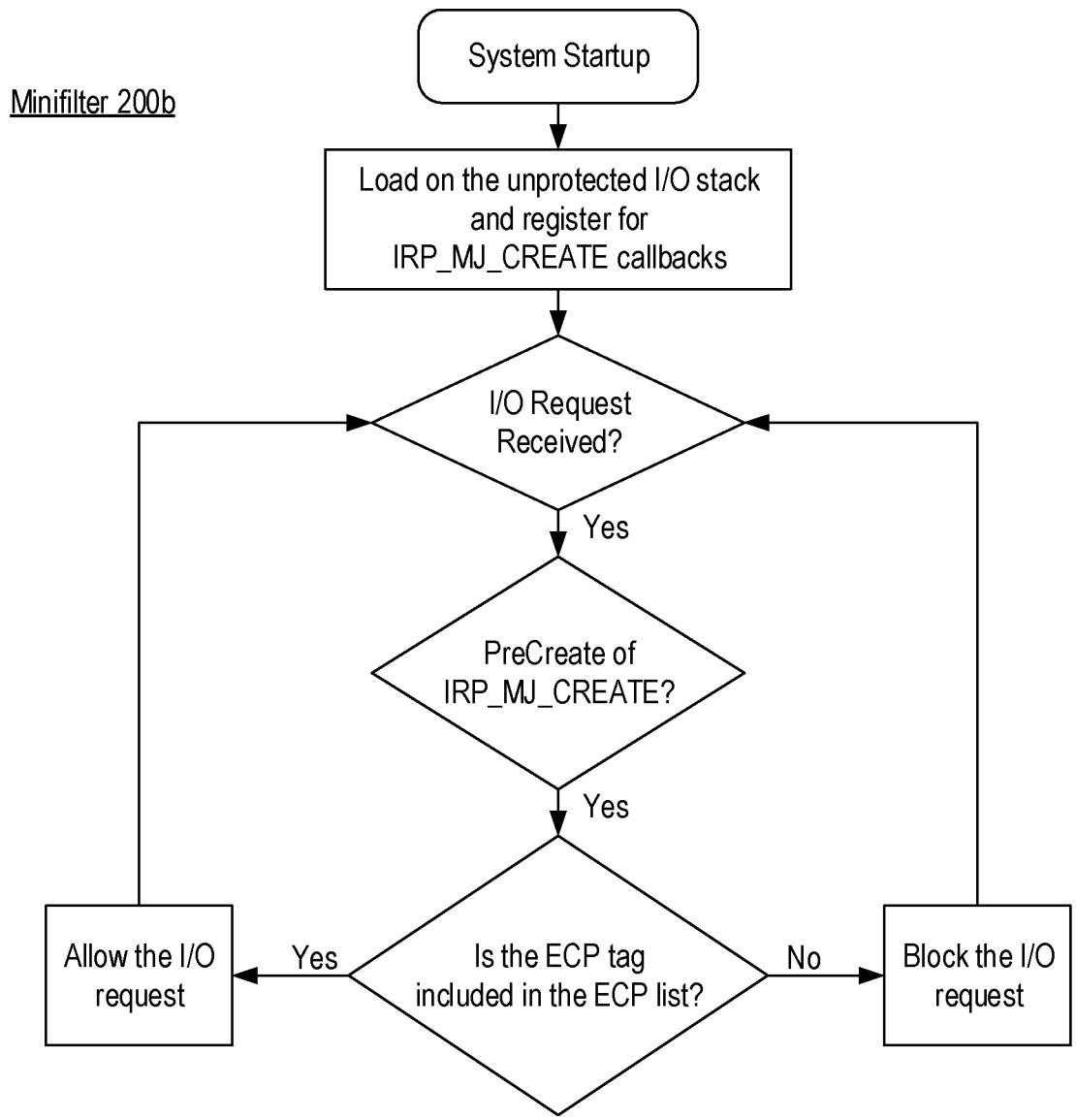

FIGS. 4A and 4B provide flow diagrams representing example processes that minifilters 200a and 200b respectively can perform to implement the above-described functionality in a Windows environment. With reference to FIG. 4A, as part of system startup on a computing device that employs a write filter, minifilter 200a can be loaded on the protected I/O stack on top of the write filter including registering for IRP_MJ_CREATE preoperation and postoperation callbacks. When minifilter 200a receives an I/O request, it can determine whether the I/O request is an IRP_MJ_CREATE request that is in its postoperation (or postcreate) processing. If so, minifilter 200a can determine whether the Status and Information members of the IRP's IO_STATUS_BLOCK structure are set to STATUS_REPARSE and IO_REPARSE respectively. If so, minifilter 200a can add a tag to the I/O request as part of the IRP's ECP.

With reference to FIG. 4B, also as part of system startup, minifilter 200b can be loaded on the unprotected I/O stack (e.g., by attaching it to the shadow volume) including registering for IRP_MJ_CREATE preoperation and postoperation callbacks. When minifilter 200b receives an I/O request, it can determine whether the I/O request is an IRP_MJ_CREATE request that is in its preoperation (or precreate) processing. If so, minifilter 200b can determine whether the I/O request includes the tag by accessing the IRP's ECP. If so, minifilter 200b can allow the I/O request. Otherwise, minifilter 200b can block the I/O request.

To summarize, security client 200 employs minifilters 200a and 200b that are loaded on the protected and unprotected I/O stacks respectively so that direct I/O requests that are passed down the unprotected I/O stack can be differentiated from reparsed I/O requests that are passed down the unprotected I/O stack. As can be seen, security client 200 eliminates the vulnerabilities that exist because of write filter 140's exclusion list functionality.

As mentioned above, security client 200 can provide the functionality that is depicted in FIGS. 3A-3D even when security client 200 itself functions as the write filter as represented in FIG. 2B. In such cases, write filter/minifilter 200a would reparse I/O request 300 (step 1c) and add the tag (step 2b). Minifilter 200b would function in the same manner.

Figure 5:
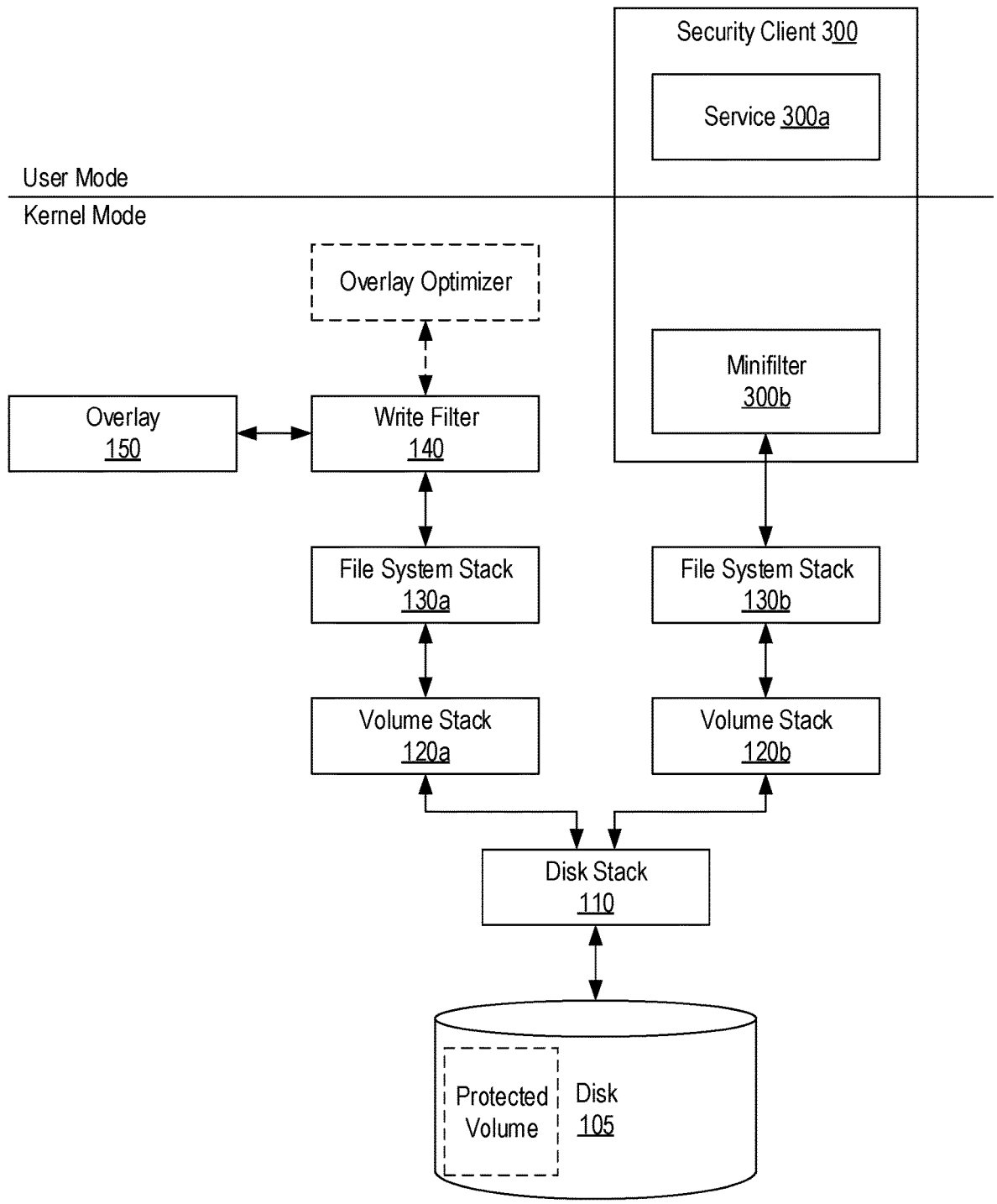
FIG. 5 illustrates another example of how a security client can be included in an I/O system architecture to prevent improper modification to the content of the protected volume.

FIG. 5 illustrates how a security client 300 may be included in architecture 100 to prevent improper modification to the content of the protected volume (the dashing of the overlay optimizer indicates that it may or may be present). Unlike security client 200, security client 300 does not include (or at least does not employ) a minifilter that is loaded on the protected I/O stack. Instead, security client 300 includes a user mode service 300a and a minifilter 300b that is loaded on the unprotected I/O stack. With this arrangement, security client 300 can block any I/O request that is directed to the unprotected I/O stack unless the I/O request targets an artifact in write filter 140's exclusion list. It is noted that security client 300 could also include minifilter 200a and minifilter 300b could be configured to perform the functionality that minifilter 200b is described as performing. In other words, a security client could perform any and all of the functionality described herein.

Figure 6A:
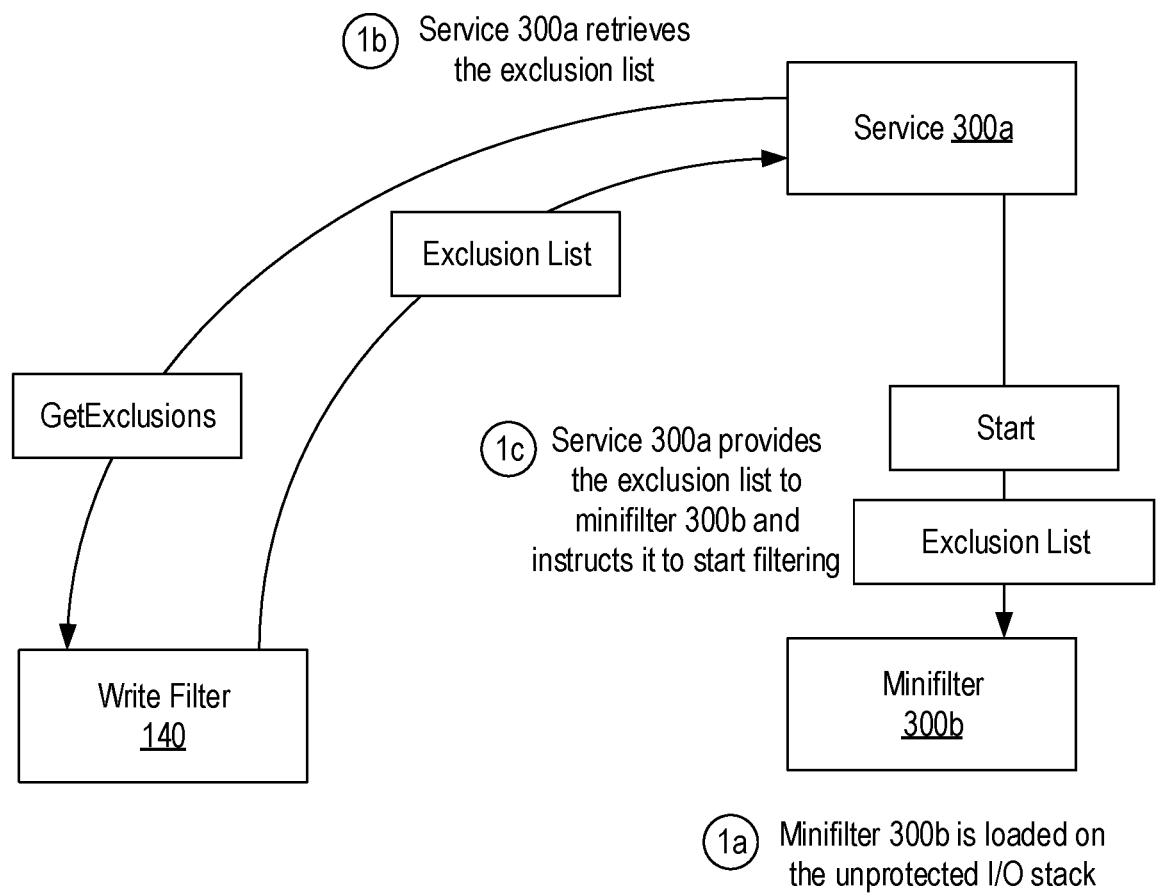
FIGS. 6A-6D illustrate how a security client can block any I/O request that is directed to the unprotected I/O stack unless the I/O request targets an artifact in a write filter's exclusion list.

FIGS. 6A-6D illustrate how security client 300 blocks any I/O request that is directed to the unprotected I/O stack unless the I/O request targets an artifact in write filter 140's exclusion list. With reference to FIG. 6A, in step 1a, it is assumed that minifilter 300b is loaded on the unprotected I/O stack. With minifilter 300b successfully loaded, in step 1b, service 300a can retrieve the exclusion list from write filter 140. For example, if write filter 140 is the UWF, service 300a can employ the UWF_Volume.GetExclusions method to retrieve the UWF_ExcludedFile objects which define each excluded file and folder (i.e., the exclusion list). In step 1c, service 300a can provide the exclusion list to minifilter 300b and instruct it to start filtering. Accordingly, minifilter 300b will receive and store the exclusion list as part of system startup. In current UWF implementations, any changes to the exclusion list do not take effect until the system is rebooted. Therefore, service 300a may only need to provide the exclusion list as part of system startup. However, if the exclusion list is capable of being modified during run time, service 300a could be configured to provide an updated exclusion list to minifilter 300b as appropriate.

Figure 6B:
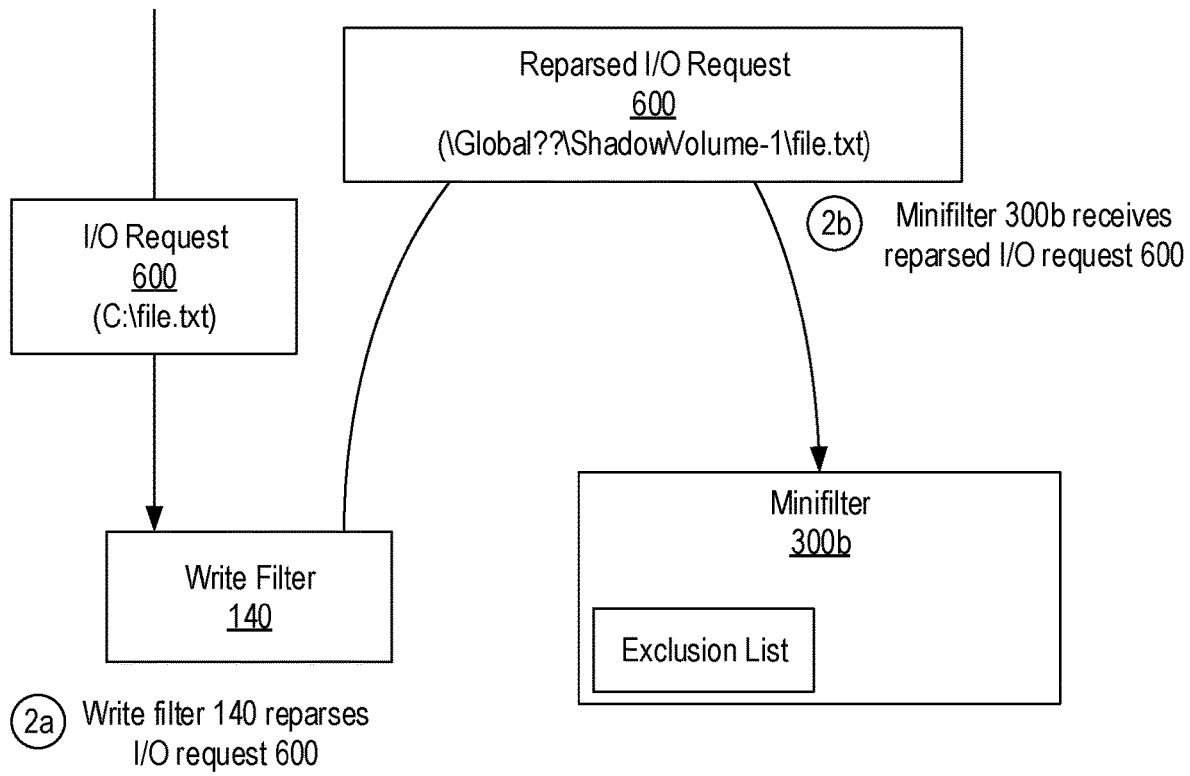

Turning to FIG. 6B, it is assumed that an I/O request 600 is generated that targets the file, C:\file.txt (where C:\ is assumed to be the drive letter assigned to the protected volume). Because I/O request 600 targets the protected volume, it will be provided to write filter 140. In this example, it will be assumed that C:\file.txt is included in write filter 140's exclusion list, and therefore, in step 21, write filter 140 will reparse I/O request 600 to the shadow volume. As a result, in step 2b, minifilter 300b receives reparsed I/O request 600. As a simplified example of how I/O request may be reparsed, FIG. 6B shows that the target of reparsed I/O request 600 has been changed from CAfile.txt to \Global??\ShadowVolume-1\file.txt.

Figure 6C:
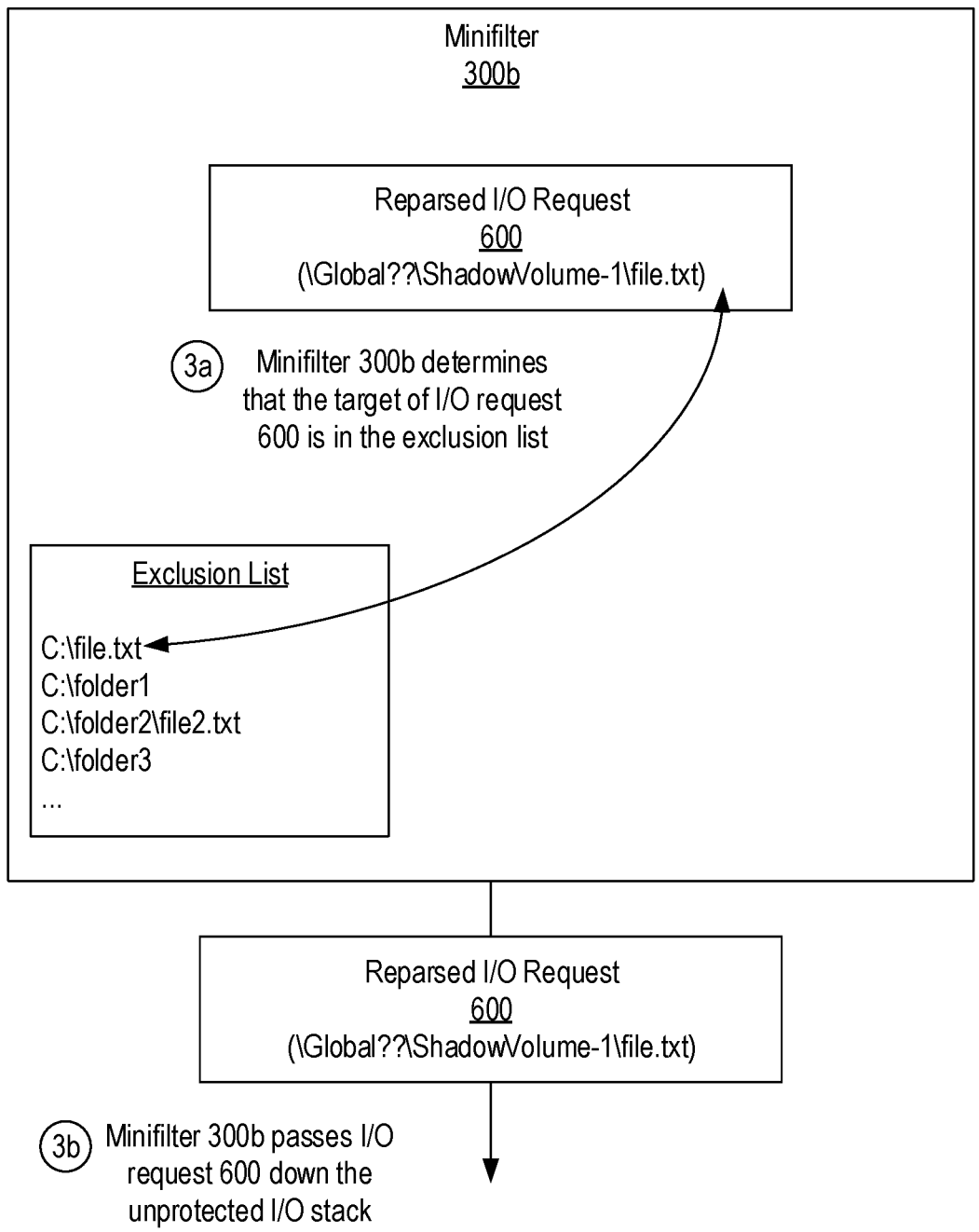

FIG. 6C represents how minifilter 300b can handle reparsed I/O request 600. In step 3a, which may be performed within minifilter 300b's preoperation callback routine for IRP_MJ_CREATE requests, minifilter 300b identifies the target of reparsed I/O request 600 and compares it to the exclusion list that minifilter 300b received from service 300a. In this example, minifilter 300b will determine that reparsed I/O request 600 targets a file in the exclusion list (i.e., that file.txt is in the exclusion list). Because the targeted file is in the exclusion list, in step 3b, minifilter 300b passes reparsed I/O request 600 down the unprotected I/O stack (e.g., by completed its preoperation callback routine with an appropriate status). As a result, I/O request 600 will reach the protected volume (e.g., the application that was the source of I/O request 600 will receive a handle to the file, file.txt, that is stored on the protected volume.

Figure 6D:
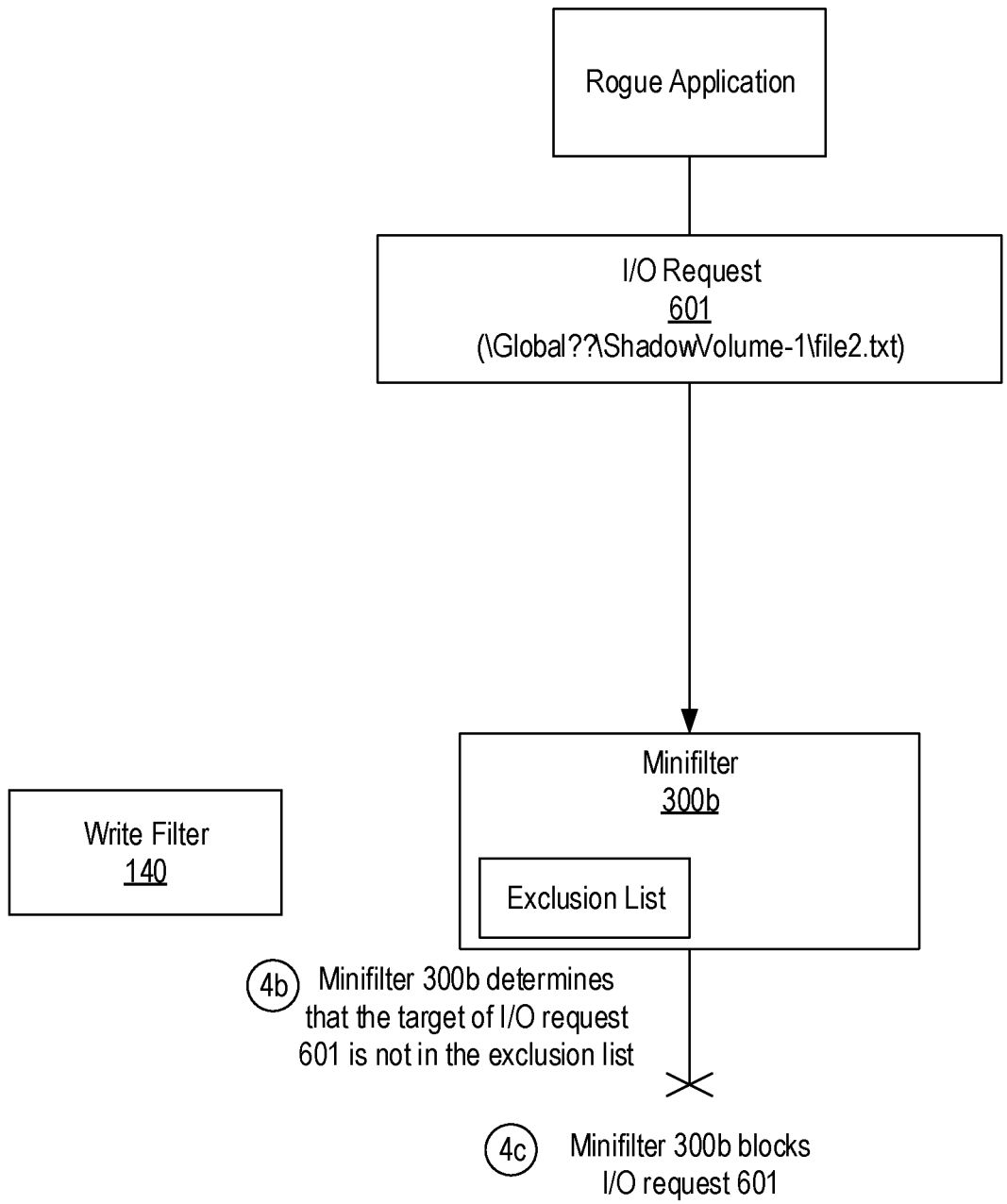

FIG. 6D illustrates a contrasting scenario in which a rogue application causes an I/O request 601 to be sent directly down the unprotected I/O stack. For example, the rogue application could submit a request to access the file \Global??\ShadowVolume-1\file2.txt which in reality is the file C:\file2.txt. In step 4a, minifilter 300b receives I/O request 601. Notably, I/O request 601 is not passed to write filter 140. In step 4b, minifilter 300b will compare the target of I/O request 601 to the exclusion list that it received from service 300a and determine that the target (file2.txt) is not included in the exclusion list. Accordingly, in step 4c, minifilter 300b can block I/O request 601 (e.g., by completing it with a status of ACCESS DENIED or another suitable status). In this way, security client 300 ensures that only I/O requests that target artifacts in the write filter's exclusion list will be passed down the unprotected I/O stack. Given that I/O requests that target excluded artifacts will typically be reparsed I/O requests, this technique provides another way to differentiate between direct and reparsed I/O requests.

Figure 7A:
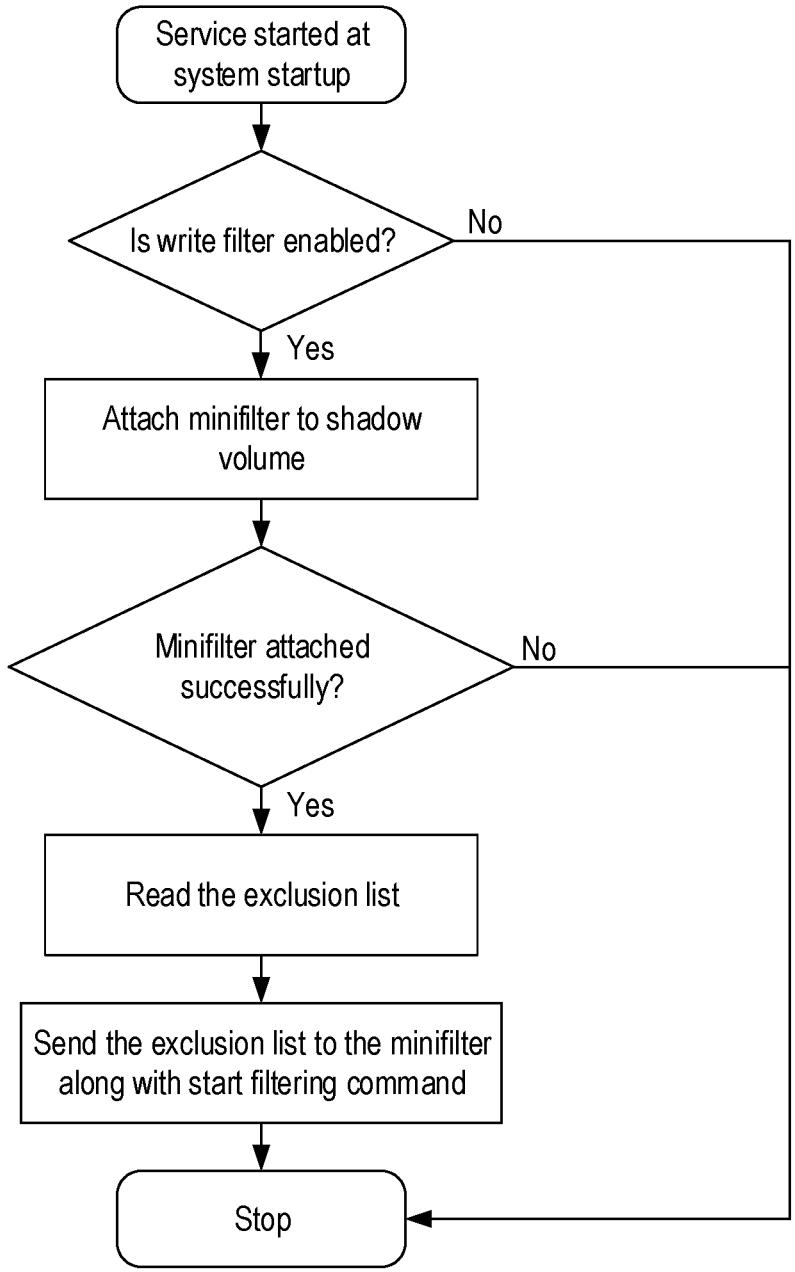
FIGS. 7A and 7B provide flow diagrams of example processes that a service and a minifilter of a security client can perform.
Figure 7B:
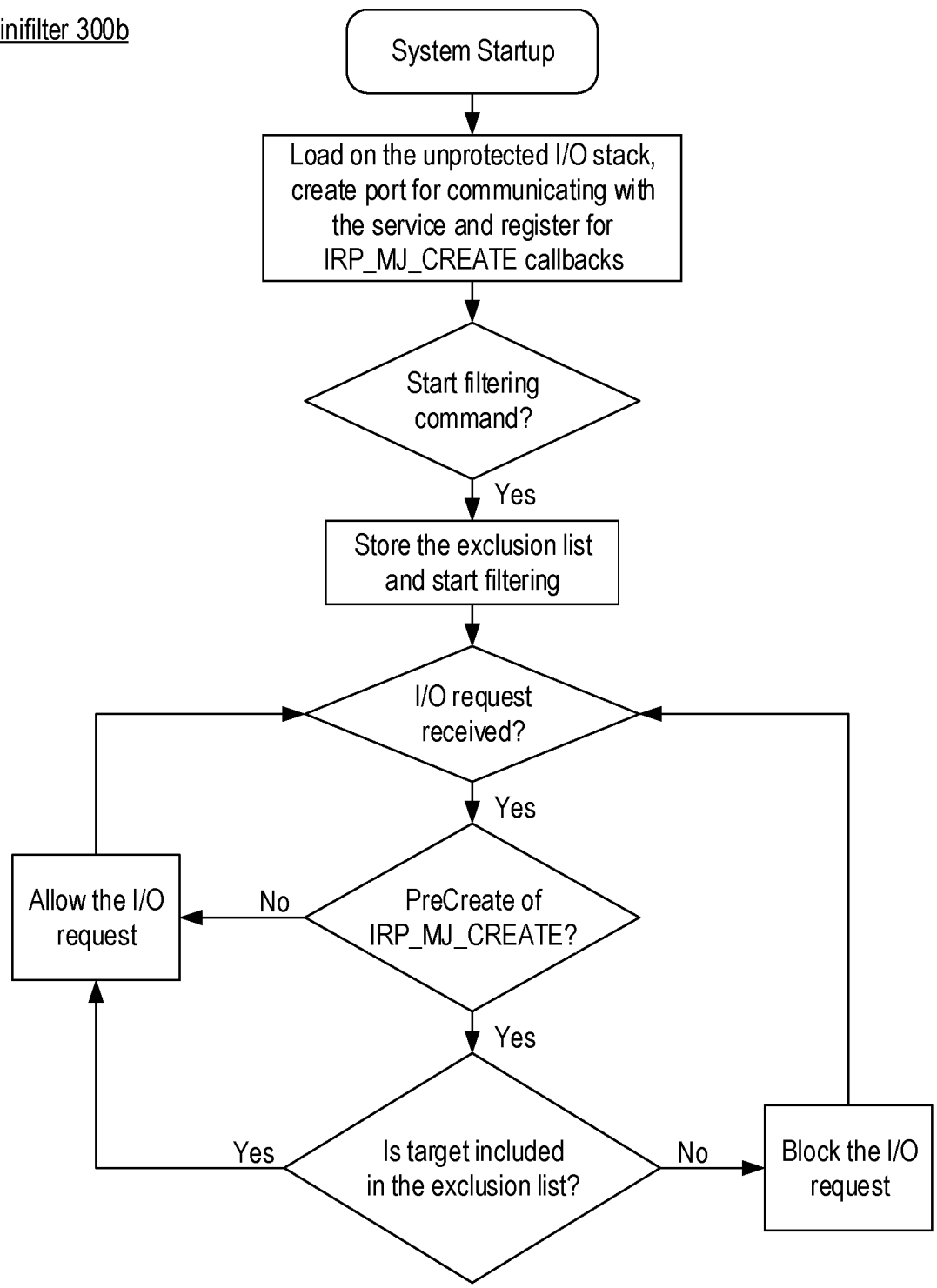

FIGS. 7A and 7B provide flow diagrams representing example processes that service 300a and minifilter 300b respectively can perform to implement the above-described functionality in a Windows environment. With reference to FIG. 7A, when service 300a is started at system startup, it can detect whether the write filter is enabled. If so, service 300a can attach minifilter 300b to the shadow volume (e.g., by calling the FilterAttach function and specifying the GUID of the shadow volume as the value for the lpVolumeName parameter). If minifilter 300b is successfully attached, service 300a can retrieve the write filter's exclusion list and send it to minifilter 300b along with a start filtering command.

With reference to FIG. 7B, as part of being attached to the shadow volume, minifilter 300b can create a communication port to allow service 300a to send the exclusion list and the start filtering command and can register for IRP_MJ_CREATE callbacks. When minifilter 300b receives the start filtering command, it can store the exclusion list that it receives from service 300a. Then, when minifilter 300b receives an I/O request, it can determine whether the I/O request is an IRP_MJ_CREATE request that is in its pre-create processing, and if so, compare the target of the I/O request to the exclusion list and allow it only when the target is in the exclusion list.

Figure 8:
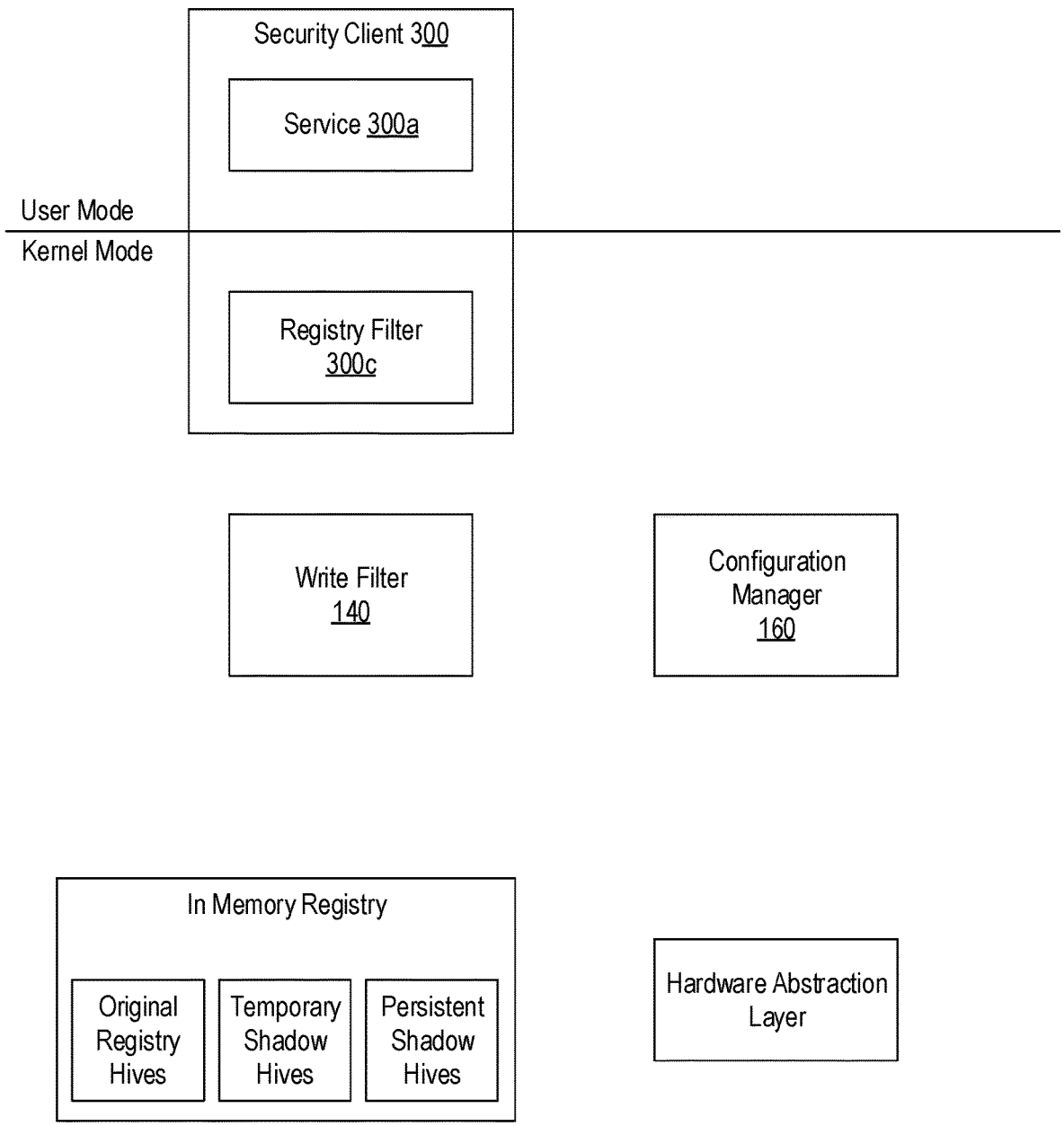
FIG. 8 illustrates another example of how a security client can be included in an I/O system architecture to prevent improper modification to the content of the protected volume.

FIG. 8 illustrates how security client 300 can be employed in architecture 100 to prevent improper modification to the registry. As shown, security client 300 may also include a registry filter 300c that is configured to be loaded above write filter 140. For example, registry filter 300c can register a registry callback routine with configuration manager 160 so that registry filter 300c will be notified whenever an operation is performed on the registry. As part of registering its registry callback routine, registry filter 300c can specify an altitude that is higher than write filter 140's altitude so that registry filter 300c will be "above" write filter 140 (i.e., registry filter 300c will be notified of a registry operation before write filter 140).

In a similar manner as shown in FIG. 6A, once registry filter 300c is loaded, service 300a can retrieve the registry exclusion list from write filter 140 and provide it to registry filter 300c along with a start filtering command. For example, when write filter 140 is the UWF, service 300a can call the UWF_RegistryFilter.GetExclusions method to retrieve the UWF_ExcludedRegistryKey objects which define each excluded registry key (i.e., the registry exclusion list).

FIGS. 9A-9D illustrate how security client 300 can block registry operations that are directed to the persistent shadow registry hives unless the targeted registry key is included in the registry exclusion list. It is assumed that service 300a has already provided the registry exclusion list to registry filter 300c and instructed it to start filtering. Accordingly, registry filter 300c is shown as storing the registry exclusion list.

Figure 9A:
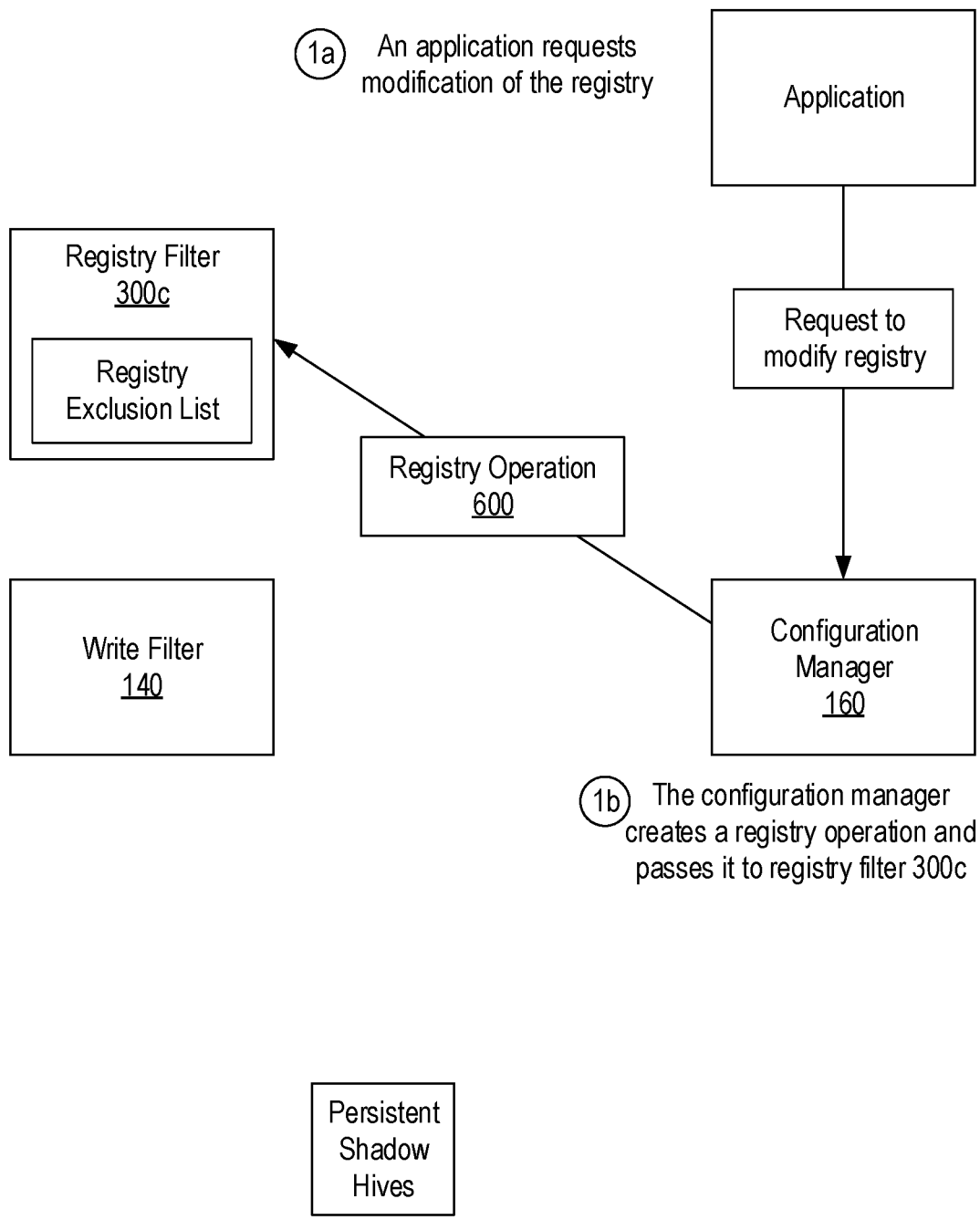
FIGS. 9A-9D illustrate how a security client can block registry operations that are directed to a write filter's persistent shadow registry hives unless the targeted registry key is included in the write filter's registry exclusion list.

With reference to FIG. 9A, in step 1a, an application requests a modification to the registry. In response, in step 1b, configuration manager 160 creates a registry operation 600 and passes it to registry filter 300c. Because registry filter 300c is loaded above write filter 140, registry filter 300c will receive registry operation 600 before write filter 140. Steps 1a and 1b can represent functionality that may be performed whenever any change to the registry is attempted.

Figure 9B:
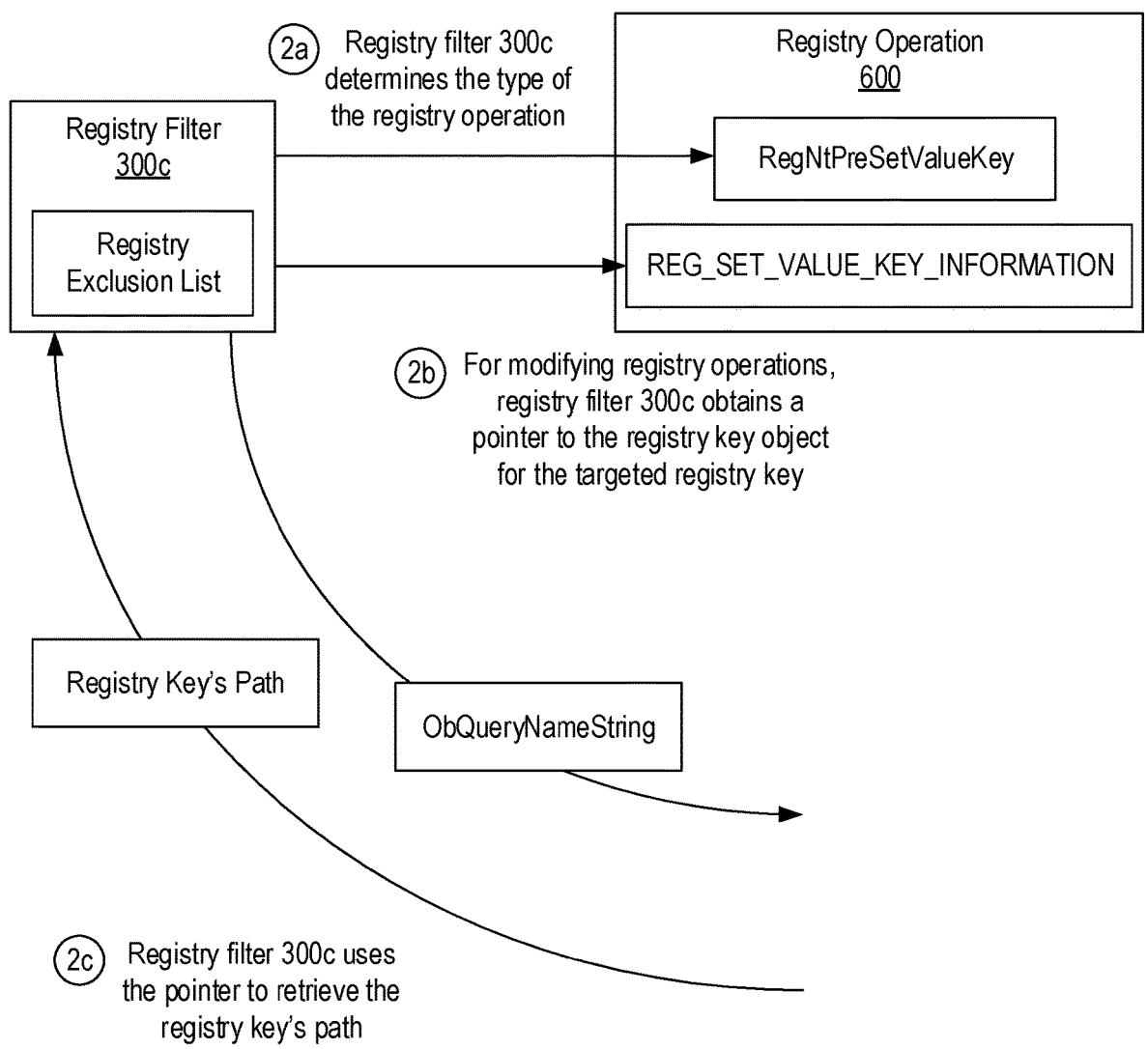

FIG. 9B illustrates how registry filter 300c can process registry operation 600. In step 2a, registry filter 300c can determine the type of registry operation 600. In particular, registry filter 300c may perform its filtering only on specific types of registry operations such as those that create (e.g., RegNtPreCreateKey), rename (e.g., RegNtPreRenameKey), delete (e.g., RegNtPreDeleteKey and RegNtPreDeleteValueKey) or modify (e.g., RegNtPreSetInformationKey and RegNtPreSetValueKey) a registry key or value (collectively "modifying registry operations"). In Windows, the type of registry operation is dependent on whether the registry operation will be or has been performed. Since registry filter 300c is intended to block registry operations, it can detect modifying registry operations that have not yet been performed (e.g., those whose type include "Pre").

In this example, it is assumed that registry operation 600 represents an attempt to set the value of an existing registry key. Accordingly, registry operation 600 is shown as having a type of RegNtPreSetValueKey and as including a REG_SET_VALUE_KEY_INFORMATION structure that provides the details for this operation. Therefore, in step 2a, registry filter 300c will determine that registry operation 600 is a modifying registry operation. On the other hand, if registry filter 300c determines that a registry operation is not a modifying registry operation, it may simply allow the registry operation to proceed.

When it determines that a registry operation is a modifying registry operation (that has not yet been performed), in step 2b, registry filter 300c can obtain a pointer to the registry key object for the targeted registry key. For example, registry filter 300c can access the structure provided with the registry operation and retrieve the pointer from the structure. For registry operation 600, registry filter 300c could read the object member of the REG_SET_VALUE_KEY_INFORMATION structure. Then, in step 2c, registry filter 300c can use the pointer to the registry key object to retrieve the path to the registry key that is the target of registry operation 600. For example, registry filter 300c could call the ObQueryNameString function and pass the pointer as input to receive an OBJECT_NAME_INFORMATION structure containing the registry key's path.

Figure 9C:
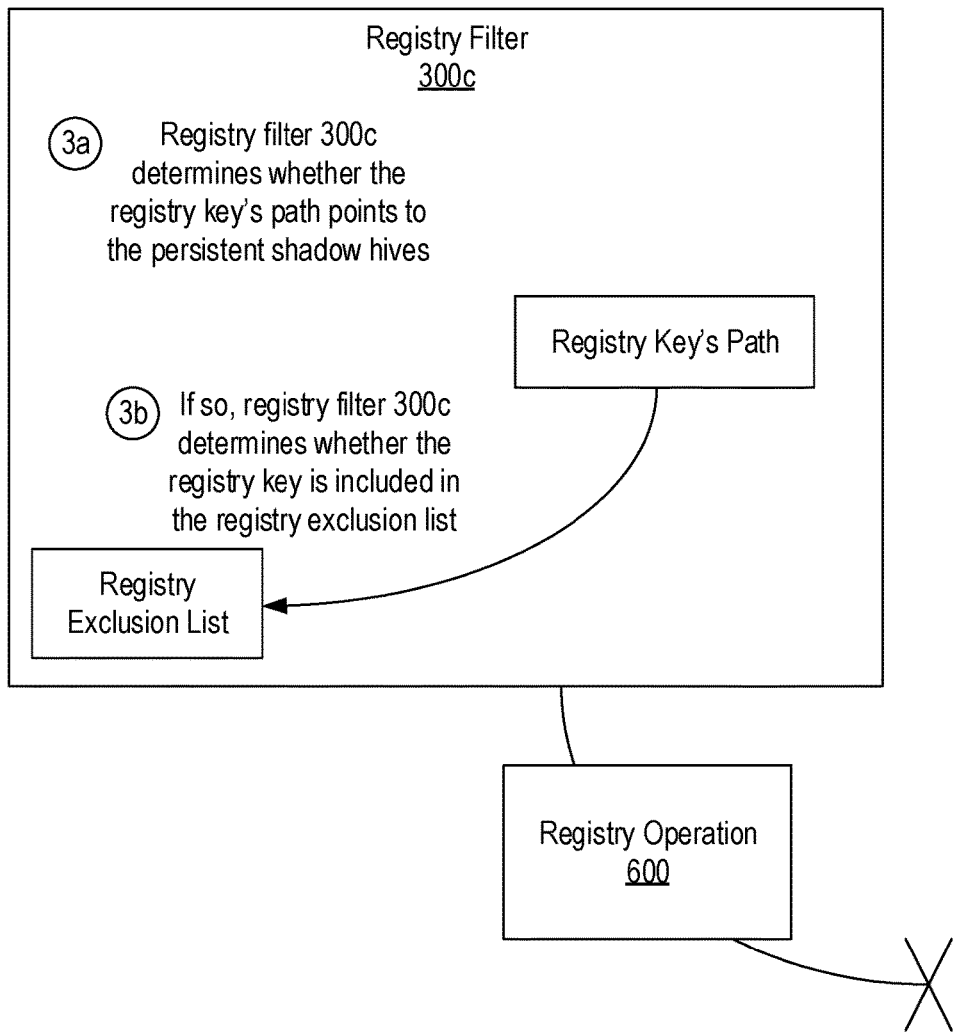

Turning to FIG. 9C, once registry filter 300c has obtained the registry key's path, in step 3a, registry filter 300c determines whether the registry key's path points to the persistent shadow registry hives. For example, registry filter 300c could be configured to know the names of each root key in the persistent shadow registry hives (e.g., HKLM\PERSISTENT_SOFTWARE, HKLM\PERSISTENT_SYSTEM, etc.) and could therefore determine that the registry key's path points to the persistent shadow registry hives if the path includes any of the names of these root keys (e.g., if the registry key's path were HKLM\PERSISTENT_SOFTWARE\Microsoft\ . . . ).

If registry filter 300c determines that the registry key's path points to the persistent shadow registry hives, in step 3b, registry filter 300c can determine whether the registry key is included in the registry exclusion list. If not, in step 3c, registry filter 300c can block registry operation 600. Otherwise, registry filter 300c can allow registry operation 600.

Figure 9D:
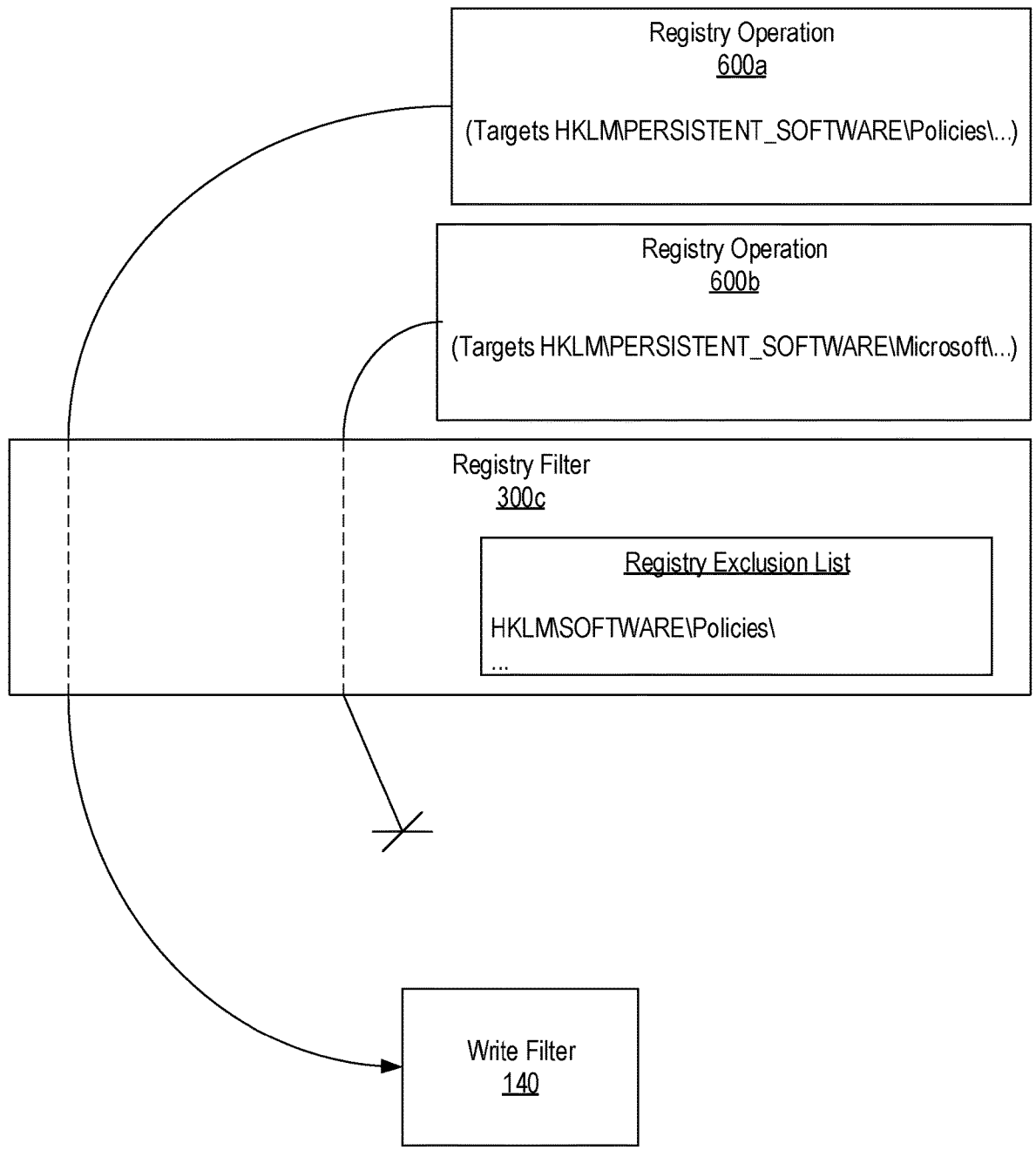

FIG. 9D provides two specific examples. Registry operation 600a is assumed to be a modifying registry operation that targets a registry key under HKLM\PERSISTENT_SOFTWARE\Polices\, while registry operation 600b is assumed to be a modifying registry operation that targets a registry key under HKLM\PERSISTENT_SOFTWARE\Microsoft\. It is also assumed that the registry exclusion list that service 300a provided to registry filter 300c includes an entry for HKLM\SOFTWARE\Polices\. In other words, the registry exclusion list indicates that write filter 140 should not filter any registry keys under HKLM\SOFTWARE\Polices\.

As represented, when performing step 3b on registry operations 600a and 600b, two different results will be reached. Specifically, registry filter 300c will determine that the registry key that is targeted by registry operation 600a is included in the registry exclusion list and therefore will not block registry operation 600a but allow it to be passed down to write filter 140 which in turn will allow registry operation 600a to proceed so that the modification is made to the persistent shadow registry hive. Registry operation 600a could therefore represent a registry operation that write filter 140 has reparsed. In contrast, registry filter 300c will determine that the registry key targeted by registry operation 600b is not included in the registry exclusion list and will therefore block it so that it is not provided to write filter 140 which would otherwise allow it to proceed so that the modification is made to the persistent shadow registry hive. Registry operation 600b could therefore represent a rogue application's attempt to bypass write filter 140 by directly targeting the persistent shadow registry hive.

Figure 10A:
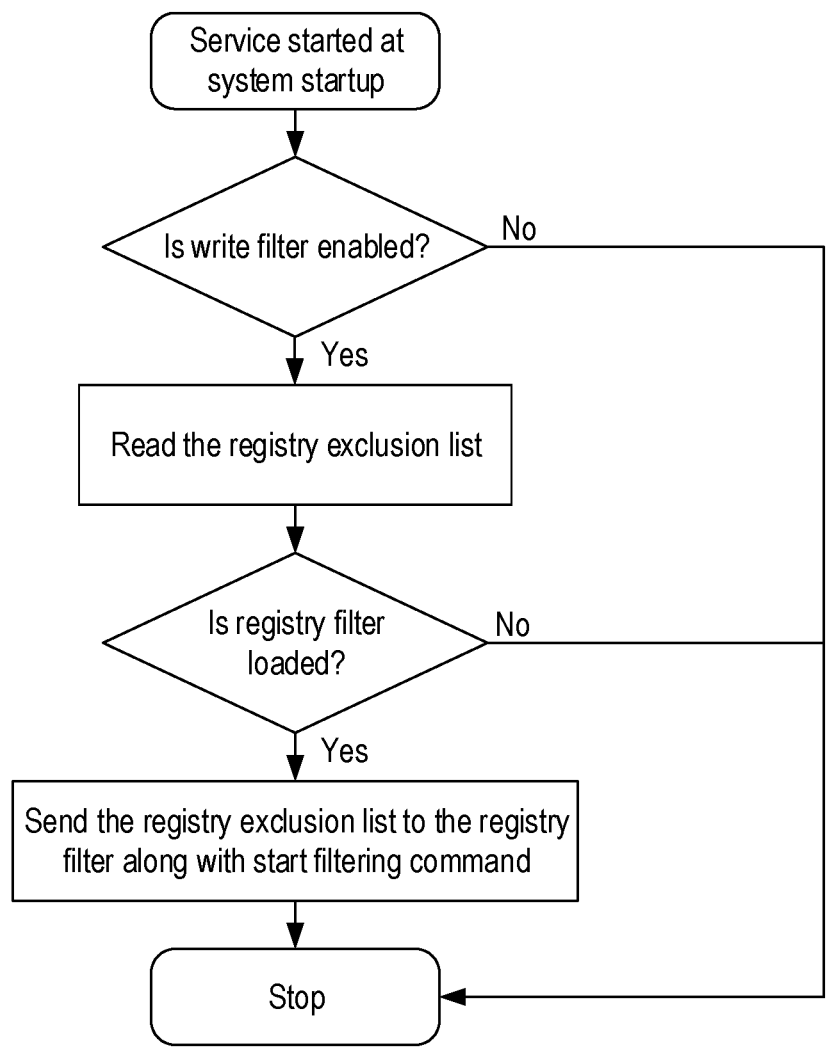
FIGS. 10A and 10B provide flow diagrams of example processes that a service and a minifilter of a security client can perform.
Figure 10B:
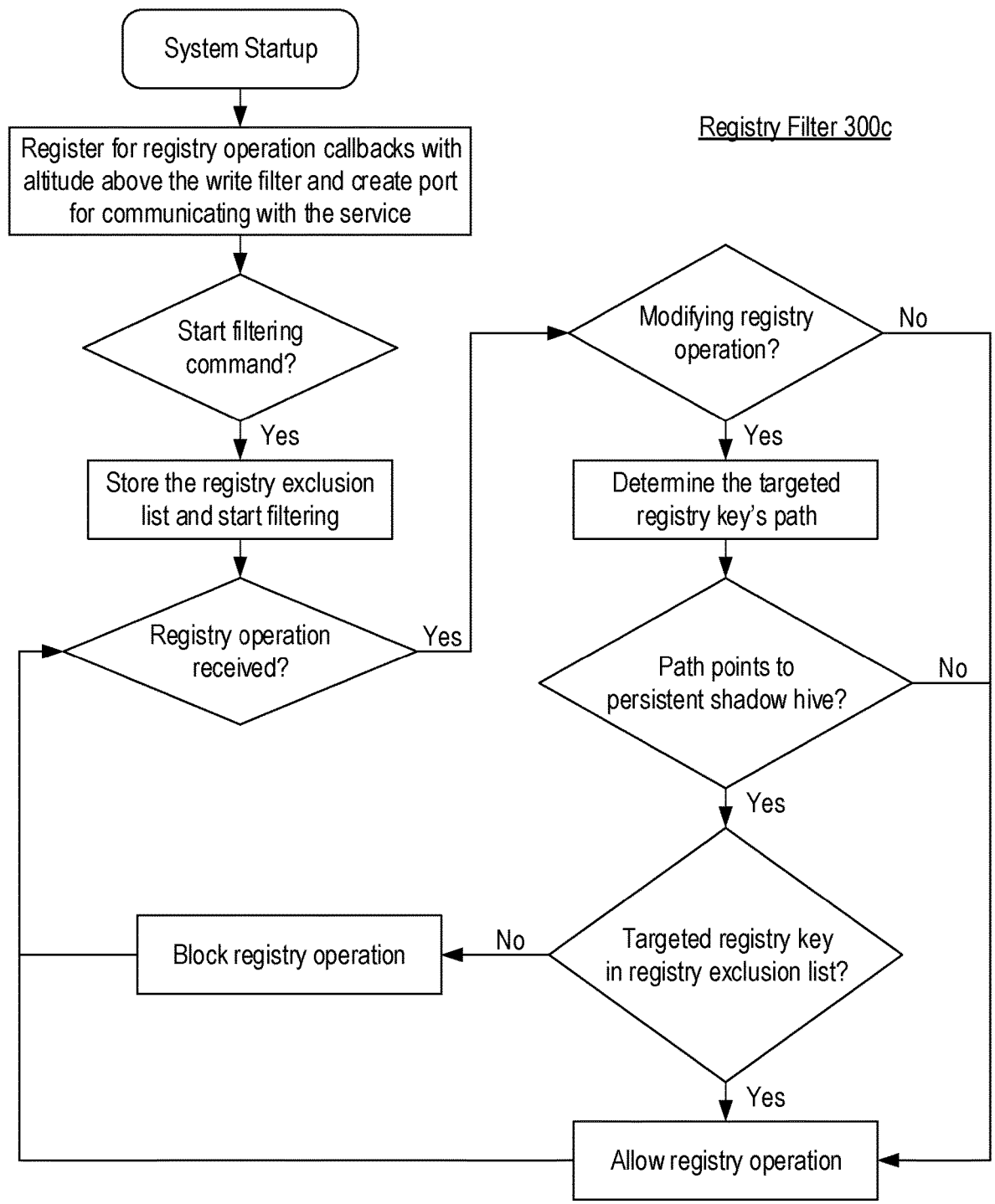

FIGS. 10A and 10B provide flow diagrams representing example processes that service 300a and registry filter 300c respectively can perform to implement the above-described functionality. FIG. 10A is similar to FIG. 7A and will not be further described. As shown in FIG. 10B, registry filter 300c can be configured to load during system startup including registering for registry operation callbacks with an altitude above write filter 140 and creating a port for communicating with service 300a. In response to receiving a start filtering command from service 300a, registry filter 300c can store the registry exclusion list provided by service 300a and commence filtering registry operations. When it receives a registry operation, registry filter 300c can determine whether it is a modifying registry operation, and if so, determine the path of the targeted registry key. Registry filter 300c can then determine whether the path points to the persistent shadow registry hives that write filter 140 maintains to enable registry exclusions. If so, registry filter 300c will block the registry operation unless it targets a registry key that is included in the registry exclusion list.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a security client on a computing device, for providing security features in a write filter environment that includes a protected I/O stack on which a write filter is loaded to prevent modification to artifacts on a protected volume and an unprotected I/O stack by which the write filter enables excluded artifacts to be modified, the method comprising:
   receiving, at a minifilter of the security client that is loaded on the unprotected I/O stack, an I/O request;
   determining, by the minifilter, whether the I/O request is a reparsed I/O request or a direct I/O request;
   when the minifilter determines that the I/O request is a reparsed I/O request, allowing the I/O request to be passed down the unprotected I/O stack; and
   when the minifilter determines that the I/O request is a direct I/O request, blocking the I/O request.

2. The method of claim 1, wherein determining that the I/O request is a reparsed I/O request comprises determining that the I/O request includes a tag that was added by another minifilter that is loaded on the protected I/O stack.

3. The method of claim 2, wherein the tag comprises Extended Create Parameters of the I/O request.

4. The method of claim 2, further comprising:
   prior to the minifilter receiving the I/O request, receiving, by the other minifilter that is loaded on the protected I/O stack, the I/O request; and
   adding, by the other minifilter, the tag to the I/O request.

5. The method of claim 4, wherein the other minifilter adds the tag to the I/O request upon determining that the write filter has reparsed the I/O request.

6. The method of claim 4, wherein the other minifilter is the write filter and adds the tag to the I/O request as part of reparsing the I/O request.

7. The method of claim 1, wherein determining that the I/O request is a reparsed I/O request comprises determining that the I/O request targets an excluded artifact.

8. The method of claim 7, wherein determining that the I/O request targets an excluded artifact comprises:
   evaluating the I/O request to identify an artifact that the I/O request targets;
   comparing the identified artifact to an exclusion list; and
   determining that the identified artifact is included in the exclusion list.

9. The method of claim 8, further comprising:
   receiving, by the minifilter and from a service, the exclusion list; and
   storing, by the minifilter, the exclusion list.

10. The method of claim 1, further comprising:
    receiving, at a registry filter of the security client, a registry operation;
    determining, by the registry filter, that the registry operation targets a persistent shadow registry hive that the write filter employs to enable excluded registry keys to be modified;
    determining, by the registry filter, that the registry operation does not target an excluded registry key; and
    blocking, by the registry filter, the registry operation.

11. The method of claim 10, wherein determining that the registry operation targets the persistent shadow registry hive comprises:
    determining a path of a registry key that the registry operation targets; and
    determining that the persistent shadow registry hive encompasses the path.

12. The method of claim 11, wherein determining that the registry operation does not target an excluded registry key comprises:
    comparing the registry key to a registry exclusion list; and
    determining that the registry key is not included in the registry exclusion list.

13. One or more computer storage media storing computer executable instructions which when executed on a computing device implement a security client that is configured to provide security features in a write filter environment that includes a protected I/O stack on which a write filter is loaded to prevent modification to artifacts on a protected volume and an unprotected I/O stack by which the write filter enables excluded artifacts to be modified, the security client providing the security features by performing a method comprising:
    receiving, at a minifilter of the security client that is loaded on the unprotected I/O stack, a first I/O request;
    determining, by the minifilter, that the first I/O request is a direct I/O request;
    in response to determining that the first I/O request is a direct I/O request, blocking the first I/O request;
    receiving, at the minifilter, a second I/O request;
    determining, by the minifilter, that the second I/O request is a reparsed I/O request; and
    in response to determining that the second I/O request is a reparsed I/O request, allowing the second I/O request.

14. The computer storage media of claim 13, wherein determining that the first I/O request is a direct I/O request and that the second I/O request is a reparsed I/O request comprises one of:
    determining that the second I/O request includes a tag that was added by another minifilter and that the first I/O request does not include the tag; or determining that first I/O request does not target an excluded artifact and that the second I/O request targets an excluded artifact.

15. The computer storage media of claim 13, wherein the method further comprises:
    receiving, at a registry filter of the security client, a registry operation;
    determining, by the registry filter, that the registry operation targets a persistent shadow registry hive that the write filter employs to enable excluded registry keys to be modified;
    determining, by the registry filter, that the registry operation does not target an excluded registry key; and
    blocking, by the registry filter, the registry operation.

16. The computer storage media of claim 15, wherein determining that the registry operation targets the persistent shadow registry hive comprises:
    determining a path of a registry key that the registry operation targets; and
    determining that the persistent shadow registry hive encompasses the path; and
    wherein determining that the registry operation does not target an excluded registry key comprises:
    comparing the registry key to a registry exclusion list; and
    determining that the registry key is not included in the registry exclusion list.

17. A method, performed by a security client on a computing device, for providing security features in a write filter environment that includes a protected I/O stack on which a write filter is loaded to prevent modification to artifacts on a protected volume and an unprotected I/O stack by which the write filter enables excluded artifacts to be modified, the method comprising:
    receiving, at a first minifilter of the security client that is loaded on the protected I/O stack, a first I/O request;
    detecting, by the first minifilter, that the first I/O request is reparsed;
    in response to detecting that the first I/O request is reparsed, adding, by the first minifilter, a tag to the first I/O request;
    receiving, at a second minifilter of the security client that is loaded on the unprotected I/O stack, the first I/O request;
    determining, by the second minifilter, that the first I/O request includes the tag; and
    in response to determining that the first I/O request includes the tag, allowing the first I/O request.

18. The method of claim 17, further comprising:
    receiving, at the second minifilter, a second I/O request;
    determining, by the second minifilter, that the second I/O request does not include the tag; and
    in response to determining that the second I/O request does not include the tag, blocking the second I/O request.

19. The method of claim 18, wherein the tag comprises Extra Create Parameters.

20. The method of claim 18, wherein the first minifilter is one of:
    loaded above the write filter;
    loaded above the write filter and an overlay optimizer; or
    the write filter.

* * * * *